United States Patent
Kaneda

(10) Patent No.: US 10,504,014 B2
(45) Date of Patent: Dec. 10, 2019

(54) INFORMATION PROCESSING APPARATUS THAT PROVIDES A NOTIFICATION TO A USER IF A PRINTING APPARATUS OPERATES IN A MODE IN WHICH A PRINT SETTING IS SET BY A PRINT APPLICATION EXECUTED IN THE INFORMATION PROCESSING APPARATUS, AND RELATED METHOD OF CONTROLLING THE INFORMATION PROCESSING APPARATUS, AND A STORAGE MEDIUM

(71) Applicant: CANON KABUSHIKI KAISHA, Tokyo (JP)

(72) Inventor: Takeshi Kaneda, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/164,974

(22) Filed: Oct. 19, 2018

(65) Prior Publication Data

US 2019/0130234 A1 May 2, 2019

(30) Foreign Application Priority Data

Oct. 27, 2017 (JP) .................................. 2017-208512

(51) Int. Cl.
*G06K 15/00* (2006.01)
*G06F 3/12* (2006.01)

(52) U.S. Cl.
CPC ....... *G06K 15/4065* (2013.01); *G06F 3/1203* (2013.01); *G06F 3/1211* (2013.01); *G06F 3/1219* (2013.01)

(58) Field of Classification Search
None
See application file for complete search history.

(56) References Cited

U.S. PATENT DOCUMENTS

| | | | |
|---|---|---|---|
| 2011/0181910 A1* | 7/2011 | Suzuki ................. | G06F 3/1205 358/1.15 |
| 2012/0147404 A1 | 6/2012 | Kubota et al. | |
| 2014/0211238 A1* | 7/2014 | Nakajima ............. | G06F 3/1238 358/1.14 |
| 2015/0002572 A1* | 1/2015 | Maeda .................. | B41J 11/003 347/16 |

FOREIGN PATENT DOCUMENTS

JP 2012-123728 A 6/2012

* cited by examiner

*Primary Examiner* — Lennin R Rodriguezgonzalez
(74) *Attorney, Agent, or Firm* — Venable LLP

(57) ABSTRACT

An information processing apparatus obtains, from a print apparatus, information indicating a print setting mode, including at least a first mode, in which the print apparatus performs printing in accordance with a print setting set by the print apparatus, and a second mode, in which the print apparatus performs printing in accordance with a print setting set by a print application executed in the information processing apparatus. If the print apparatus is set to the second mode, the print setting set by the print application is applied to the print apparatus in preference to the print setting set by the print apparatus. If the obtained information indicates that the print apparatus is set to the second mode and a user has confirmed a print setting without making a print setting for a predetermined setting item, the user is prompted to make a print setting for the predetermined setting item.

19 Claims, 23 Drawing Sheets

PRINT SETTING
SHEET SELECTION
 SIZE  FEED SOURCE  SHEET TYPE
 [A4]  [CASSETTE 1]  [INDEX SHEET]
SHEET DETAIL INFORMATION
 INDEX WIDTH  [0] mm ← 841
 NUMBER OF SETS FOR INDEX SHEET  [0]

811 — [PRINT]  [CANCEL]

850

WARNING ⚠ PLEASE SET INDEX WIDTH/NUMBER OF SETS FOR INDEX SHEET

860

PRINT SETTING
SHEET SELECTION
 SIZE  FEED SOURCE  SHEET TYPE
 [DL]  [MANUAL FEED]  [ENVELOPE]
SHEET DETAIL INFORMATION
 ENVELOPE FLAP WIDTH  [0] mm ← 861

811 — [PRINT]  [CANCEL]

870

WARNING ⚠ PLEASE SET FLAP WIDTH FOR ENVELOPE (DL).

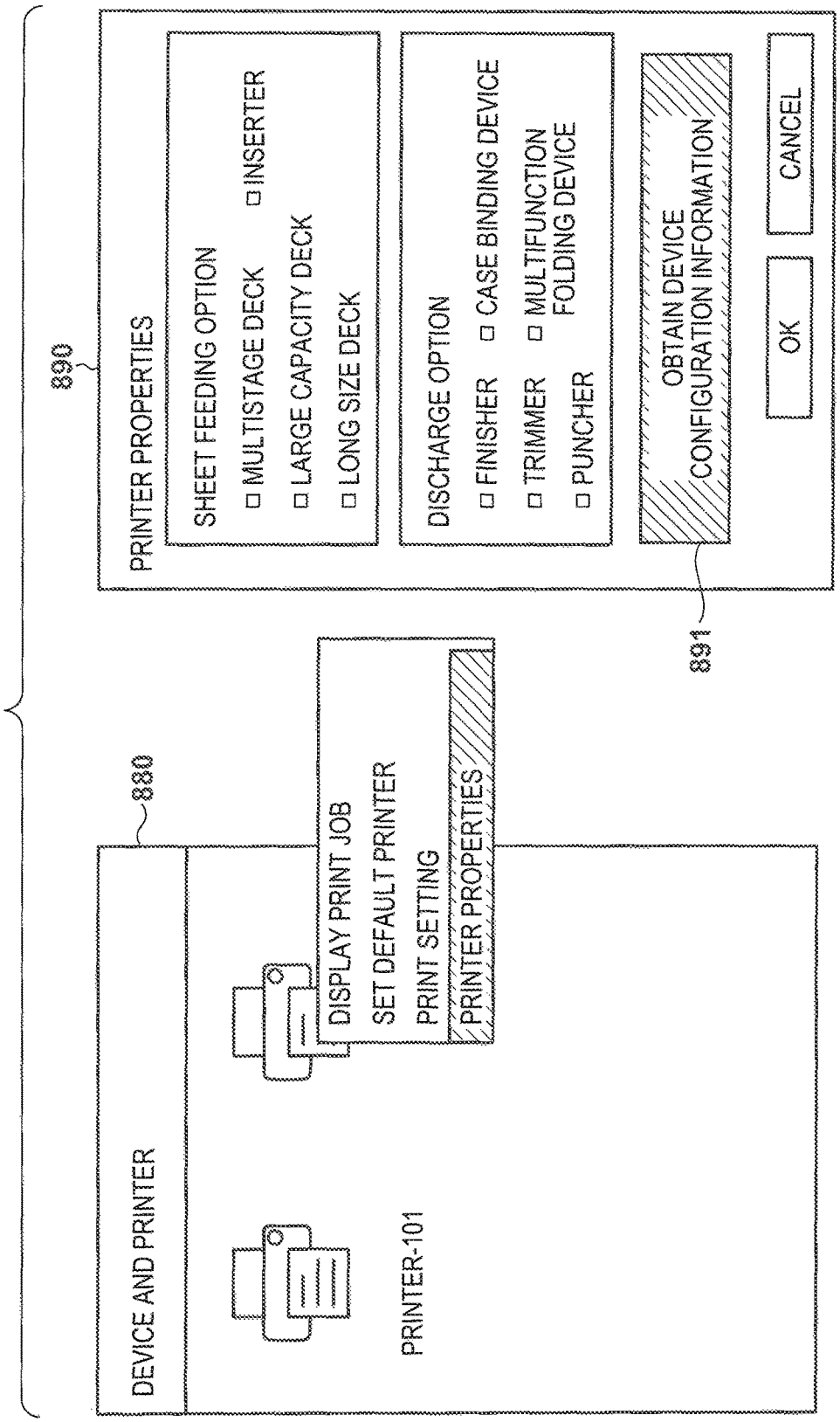

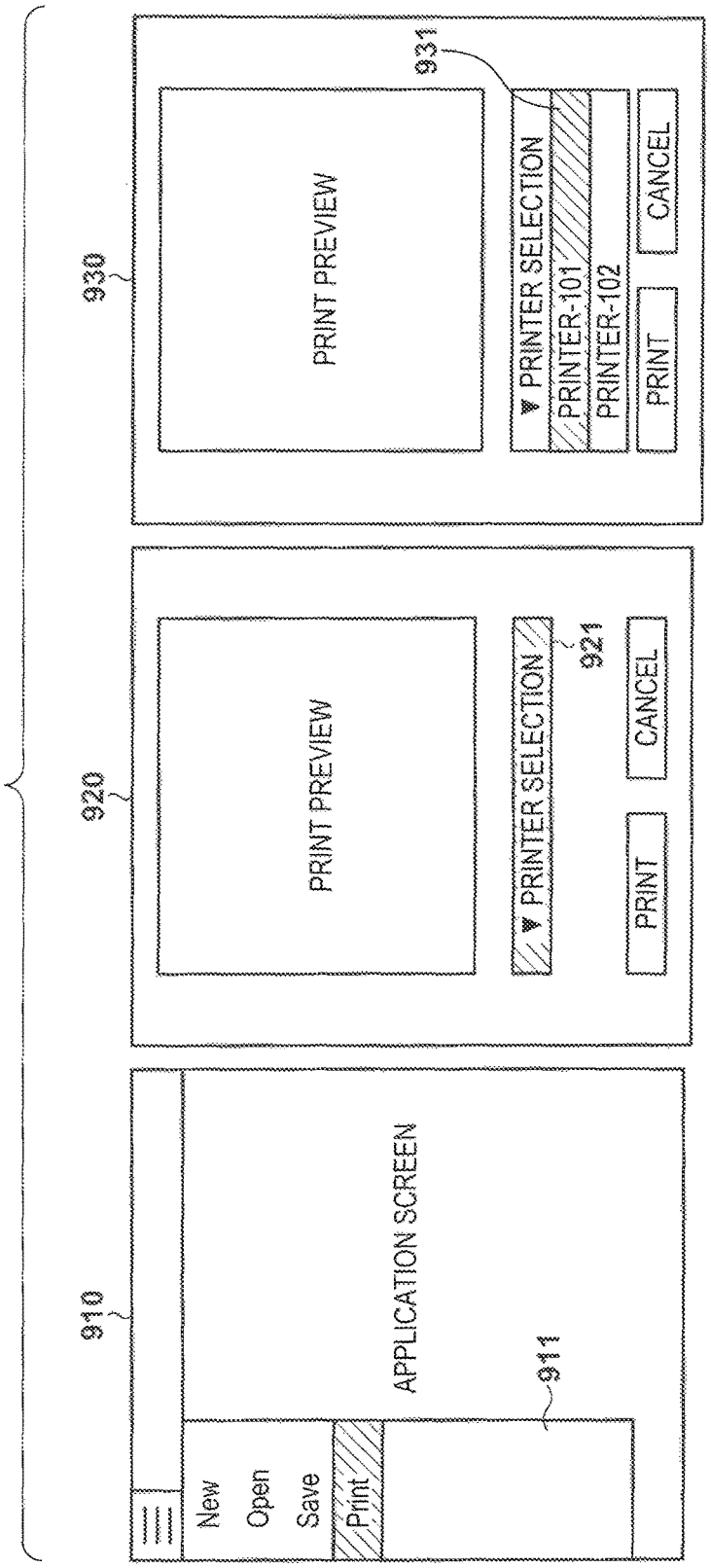

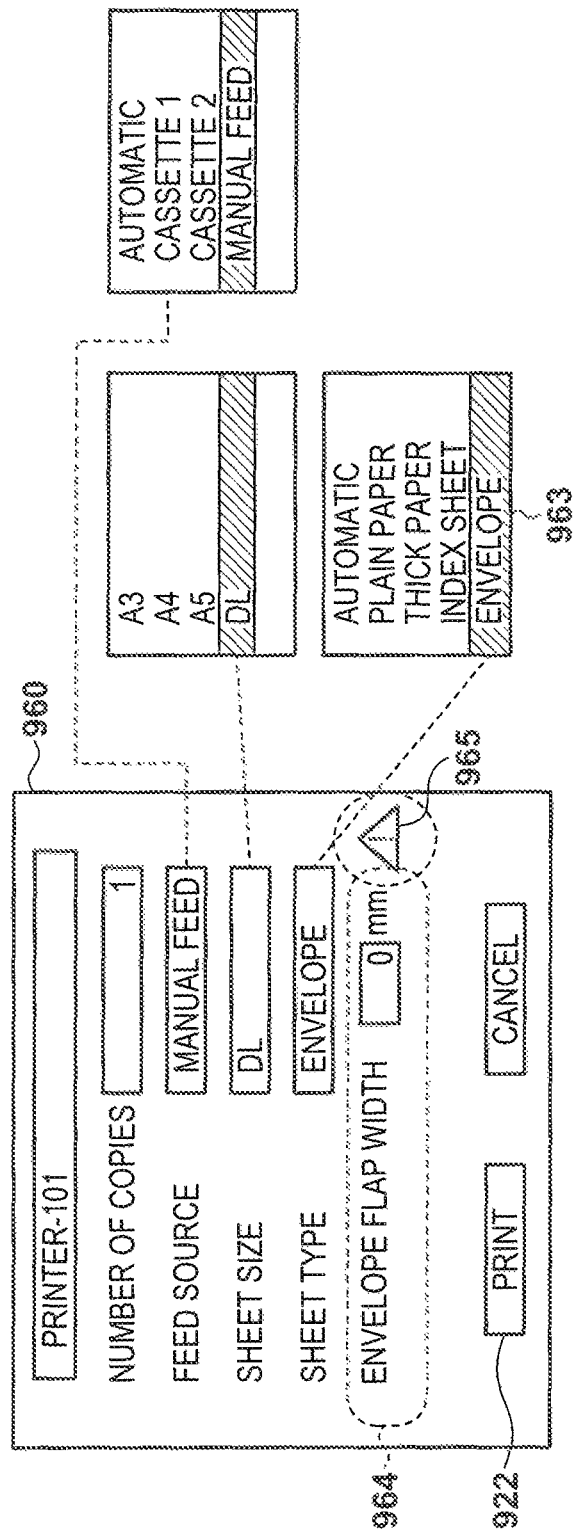

FIG. 10A

```xml
<?xml version="1.0" encoding="UTF-8"?>
<PrintDeviceCapabilities
```
~1000

```xml
<psk:JobInputBin psf2:psftype="Feature">
  <psk:AutoSelect psf2:psftype="Option">
    <psk:FeedDirection xsi:type="xsd:QName" psf2:psftype="Property">
      psk:ShortEdgeFirst
    </psk:FeedDirection>
  </psk:AutoSelect>
  <psk:Manual psf2:psftype="Option">
    <psk:FeedType xsi:type="xsd:QName" psf2:psftype="ScoredProperty">psk:Manual</psk:FeedType>
  </psk:Manual>
  :
</psk:JobInputBin>
```
~1010

```xml
<psk:PageMediaSize psf2:psftype="Feature">
  <psk:ISOA3 psf2:psftype="Option">
    <psk12:PortraitImageableSize xsi:type="psf2:ImageableAreaType" psf2:psftype="Property">
      5000.5000.2870000.4100000
    </psk12:PortraitImageableSize>
    <psk:MediaSizeHeight xsi:type="xsd:integer" psf2:psftype="ScoredProperty">420000<psk:MediaSizeHeight>
    <psk:MediaSizeWidth xsi:type="xsd:integer" psf2:psftype="ScoredProperty">297000<psk:MediaSizeWidth>
  </psk:ISOA3>
  :
</psk:PageMediaSize>
```
~1020

```xml
<psk:PageMediaType psf2:psftype="Feature">
  <psk:PageMediaType>AutoSelect</psk:PageMediaType>
  <psk:PageMediaType>Plain</psk:PageMediaType>
  <psk:PageMediaType>Bond</psk:PageMediaType>
  <psk:PageMediaType>TabStockPreCut</psk:PageMediaType>
  <psk:PageMediaType>EnvelopePlain</psk:PageMediaType>
<psk:PageMediaType>
```
~1030

```xml
<psk:PageCommandOverwriteInputBinSetting psf2:psftype="Feature">
  <psk:Off psf2:psftype="Option" />
  <psk:On psf2:psftype="Option" psf2:default="true" />
</psk:PageCommandOverwriteInputBinSetting>
```
~1040

```xml
<psk:EnvelopeFlapWidth psf2:psftype="Feature">
  <psf:ScoredProperty name="psk:FlapWidth"><psf:Value xsi:type="xs:integer">50</psf:Value></psf:ScoredProperty>
</psk:EnvelopeFlapWidth>
```
~1050

```xml
<psk:IndexPaperIndexWidth psf2:psftype="Feature">
  <psf:ScoredProperty name="psk:IndexWidth"><psf:Value xsi:type="xs:integer">50</psf:Value></psf:ScoredProperty>
</psk:IndexPaperIndexWidth>
```
~1060

```xml
<psk:IndexPaperIndexGroupNum psf2:psftype="Feature">
  <psf:ScoredProperty name="psk:IndexGruopNum"><psf:Value xsi:type="xs:integer">10</psf:Value></psf:ScoredProperty>
</psk:IndexPaperIndexGroupNum>
```
~1070

FIG. 10B

```
<psf:InvalidCombination>                                                                     — 1080
  <psf:InvalidCombinationEntry psf:feature="psk:PageCommandOverwriteInputBinSetting" psf:option="psk:On" />
  <psf:InvalidCombinationEntry psf:feature="psk:IndexPaperIndexWidth">
    <psf:Value xsi:type="xsi:integer">0</psf:Value>                 — 1081
  </psk:IndexPaperIndexWidth>
</psf:InvalidCombination>

<psf:InvalidCombination>                                                                     — 1090
  <psf:InvalidCombinationEntry psf:feature="psk:PageCommandOverwriteInputBinSetting" psf:option="psk:On" />
  <psf:InvalidCombinationEntry psf:feature="psk:IndexPaperIndexGroupNum">
    <psf:Value xsi:type="xsi:integer">0</psf:Value>                 — 1091
  </psk:IndexPaperIndexGroupNum>
</psf:InvalidCombination>

<psf:InvalidCombination>                                                                     — 1100
  <psf:InvalidCombinationEntry psf:feature="psk:PageCommandOverwriteInputBinSetting" psf:option="psk:On" />
  <psf:InvalidCombinationEntry psf:feature="psk:EnvelopeFlapWidth">
    <psf:Value xsi:type="xsi:integer">0</psf:Value>                 — 1101
  </psk:EnvelopeFlapWidth>
</psf:InvalidCombination>

<psf:InvalidCombination>                                                                     — 1110
  <psf:InvalidCombinationEntry psf:feature="psk:PageCommandOverwriteInputBinSetting" psf:option="psk:On" />
  <psk:PageMediaType psf2:xsi:type="Feature">
    <psk:PageMediaType>AutoSelect</psk:PageMediaType>               — 1111
  </psk:PageMediaType>
</psf:InvalidCombination>
</PrintDeviceCapabilities>
```

FIG. 11

./FileName.xps//Metadata/Job_PT.xml

```
<psf:PrintTicket>
<psf:ParameterInit name="psk:JobCopiesAllDocuments">
<psf:Value xsi:type="xsd:integer">1</psf:Value>
</psf:ParameterInit>
<psf:Feature name="psk:PageMediaSize">
<psf:Option name="psk:ISOA4">
<psf:ScoredProperty name="psk:MediaSizeWidth">
<psf:Value xsi:type="xsd:integer">210000</psf:Value>
</psf:ScoredProperty>
<psf:ScoredProperty name="psk:MediaSizeHeight">
<psf:Value xsi:type="xsd:integer">297000</psf:Value>
</psf:ScoredProperty>
</psf:Option>
</psf:Feature>
```
— 11021
```
<psf:Feature name="psk:PageMediaType">
<psf:Option name="psk:Plain">
</psf:Feature>
```

```
<psf:Feature name="psk:JobInputBin">
<psf:Option name="psk:AutoSelect"/>
</psf:Feature>
<psf:Feature name="psk:DocumentCollate">
<psf:Option name="psk:Uncollated"/>
</psf:Feature>
<psf:Feature name="psk:PageResolution">
<psf:Option name="ns0000:Option1">
<psf:ScoredProperty name="psk:ResolutionX">
<psf:Value xsi:type="xsd:integer">600</psf:Value>
</psf:ScoredProperty>
<psf:ScoredProperty name="psk:ResolutionY">
<psf:Value xsi:type="xsd:integer">600</psf:Value>
</psf:ScoredProperty>
</psf:Option>
</psf:Feature>
```
11023
— 11022
```
<psf:Feature name="psk:EnvelopeFlapWidth">
 <psf:ScoredProperty name="psk:FlapWidth">
  <psf:Value xsi:type="xs:integer">0</psf:Value>
 </psf:ScoredProperty>
</psf:Feature>

<psf:Feature name="psk:IndexWidth">
 <psf:ScoredProperty name="psk:IndexWidth">
  <psf:Value xsi:type="xs:integer">0</psf:Value>
 </psf:ScoredProperty>
</psf:Feature>

<psf:Feature name="psk:IndexGroupNum">
 <psf:ScoredProperty name="psk:IndexGroupNum">
  <psf:Value xsi:type="xs:integer">0</psf:Value>
 </psf:ScoredProperty>
</psf:Feature>
```
— 11024
`</psf:PrintTicket>`

— 11020

Document 1

| A4 AutoSelect | A4 Bond |
| P1 | P2 |

— 11030

./FileName.xps/Documents/1/Metadata/Page1_PT.xml

```
<psf:PrintTicket>

<psf:Feature name="psk:PageMediaSize">
<psf:Option name="psk:ISOA3">
<psf:ScoredProperty name="psk:MediaSizeWidth">
<psf:Value xsi:type="xsd:integer">297000</psf:Value>
</psf:ScoredProperty>
<psf:ScoredProperty name="psk:MediaSizeHeight">
<psf:Value xsi:type="xsd:integer">420000</psf:Value>
</psf:ScoredProperty>
</psf:Option>
</psf:Feature>
```
— 11031
```
<psf:Feature name="psk:PageMediaType">
<psf:Option name="psk:AutoSelect">
</psf:Feature>
```

`</psf:PrintTicket>`

— 11040

./FileName.xps/Documents/1/Metadata/Page2_PT.xml

```
<psf:PrintTicket>

<psf:Feature name="psk:PageMediaSize">
<psf:Option name="psk:ISOA3">
<psf:ScoredProperty name="psk:MediaSizeWidth">
<psf:Value xsi:type="xsd:integer">297000</psf:Value>
</psf:ScoredProperty>
<psf:ScoredProperty name="psk:MediaSizeHeight">
<psf:Value xsi:type="xsd:integer">420000</psf:Value>
</psf:ScoredProperty>
</psf:Option>
</psf:Feature>
```
— 11041
```
<psf:Feature name="psk:PageMediaType">
<psf:Option name="psk:Bond">
</psf:Feature>
```

`</psf:PrintTicket>`

| | PDL DATA PRIORITY MODE | SHEET FEEDING STAGE SETTING MODE |
|---|---|---|
| CASSETTE 1 | ☐ | ☑ |
| CASSETTE 2 | ☐ | ☑ |
| CASSETTE 3 | ☐ | ☑ |
| CASSETTE 4 | ☐ | ☑ |
| MANUAL FEED TRAY | ☑ | ☐ |

[ CANCEL ]　　　　　　　　　[ OK ]

1220

| | SIZE/ORIENTATION | SHEET TYPE |
|---|---|---|
| CASSETTE 1 | A4 | PLAIN PAPER |
| CASSETTE 2 | A4 R | PLAIN PAPER |
| CASSETTE 3 | A3 R | RECYCLED PAPER |
| CASSETTE 4 | B4 R | PLAIN PAPER |
| MANUAL FEED TRAY | DL | ENVELOPE |

[ CANCEL ]　　　　　　　　　[ OK ]

1230

SETTINGS FOR CASSETTE 1

A4 PLAIN PAPER

SETTINGS FOR SIZE/ORIENTATION — 1231

SHEET TYPE SETTING — 1232

[ CANCEL ]　　　　　　　　　[ OK ]

FIG. 12B

CASSETTE 1 : SELECT SHEET SIZE — 1240

| A4 | B5 |
| A4 R | B5 R |
| A3 R | 305x457mm |
| A5 | SRA3 |
| A5 R | |
| B4 | |

CANCEL    OK

CASSETTE 1 : SELECT SHEET TYPE — 1250

| THIN PAPER 2 | THIN PAPER 1 | PLAIN PAPER 1 | PLAIN PAPER 2 |
| PLAIN PAPER 3 | THICK PAPER 1 | THICK PAPER 2 | THICK PAPER 3 |
| THICK PAPER 4 | THICK PAPER 5 | ENVELOPE | INDEX SHEET |
| RECYCLED PAPER 1 | RECYCLED PAPER 2 | RECYCLED PAPER 3 | PUNCHED PAPER |
| OHP | LABEL PAPER | COLORED PAPER | |

CANCEL    OK

FIG. 12C
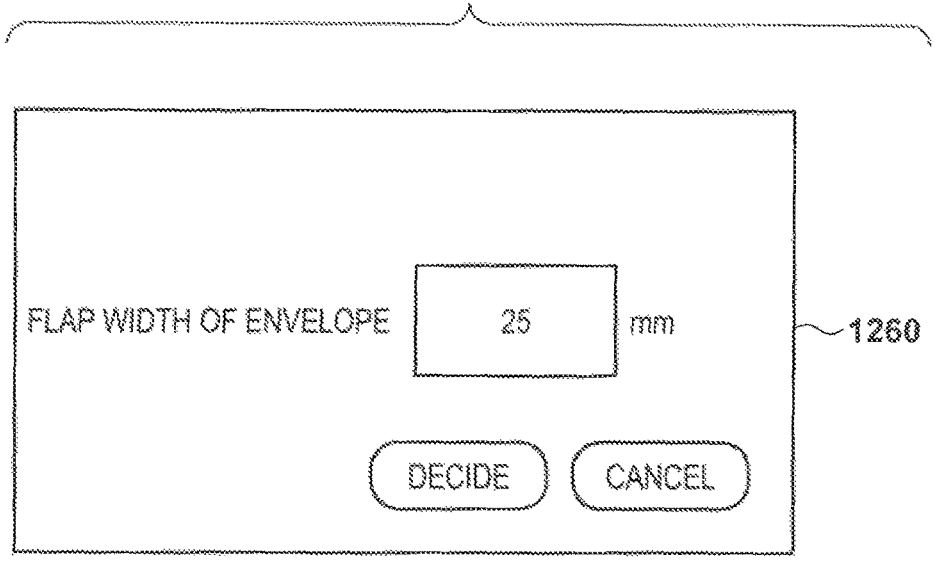
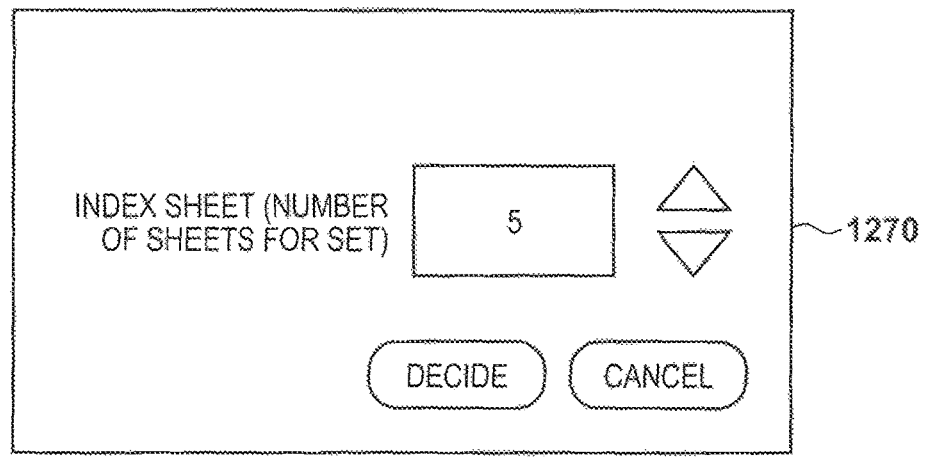
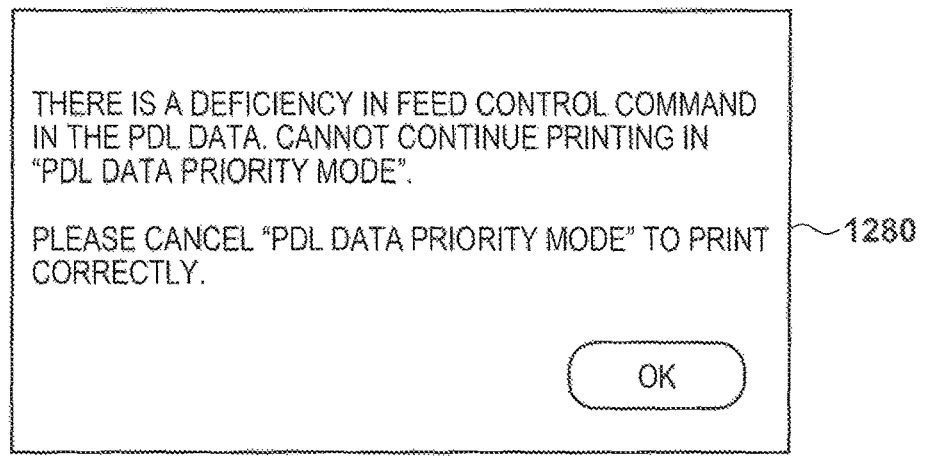

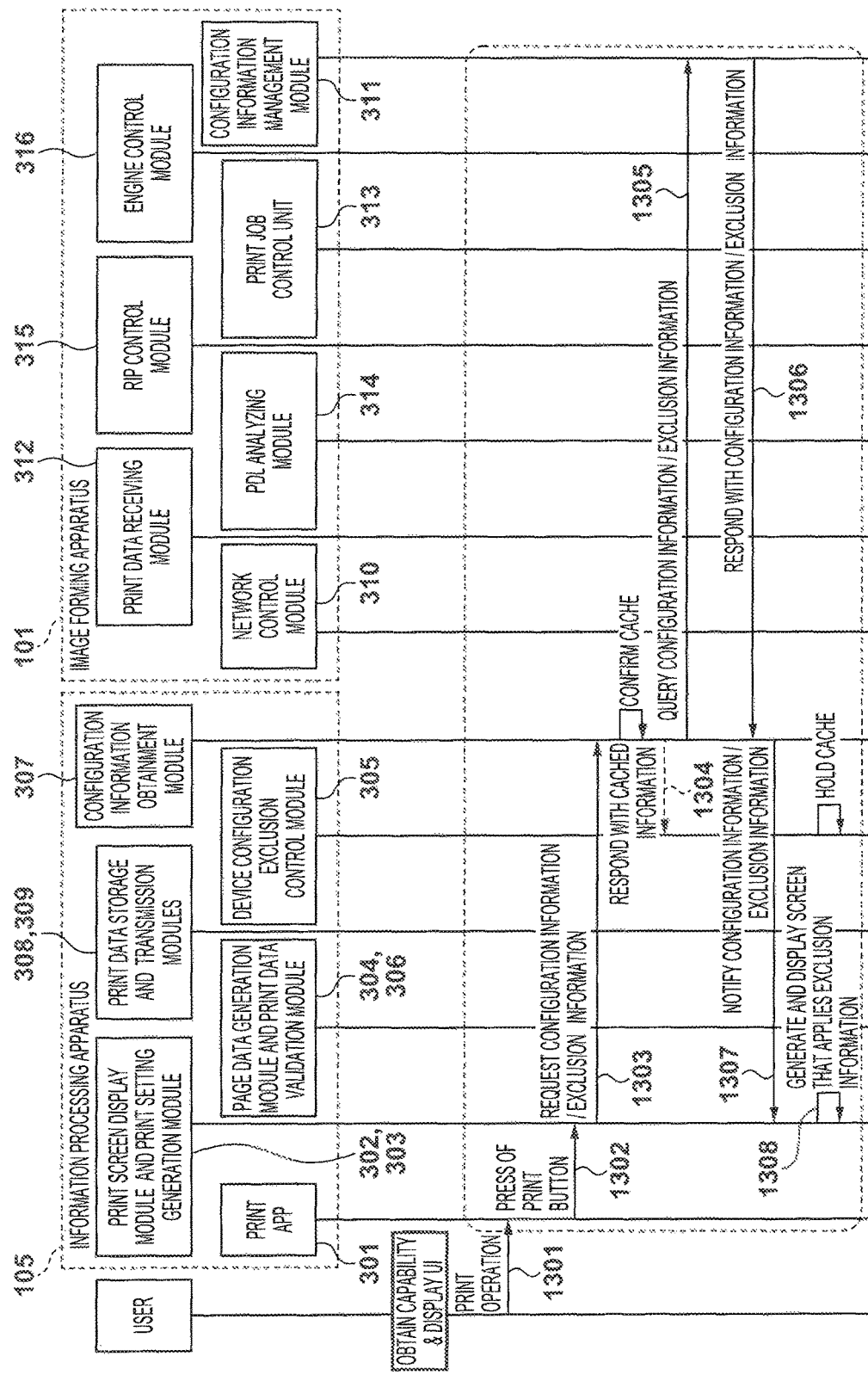

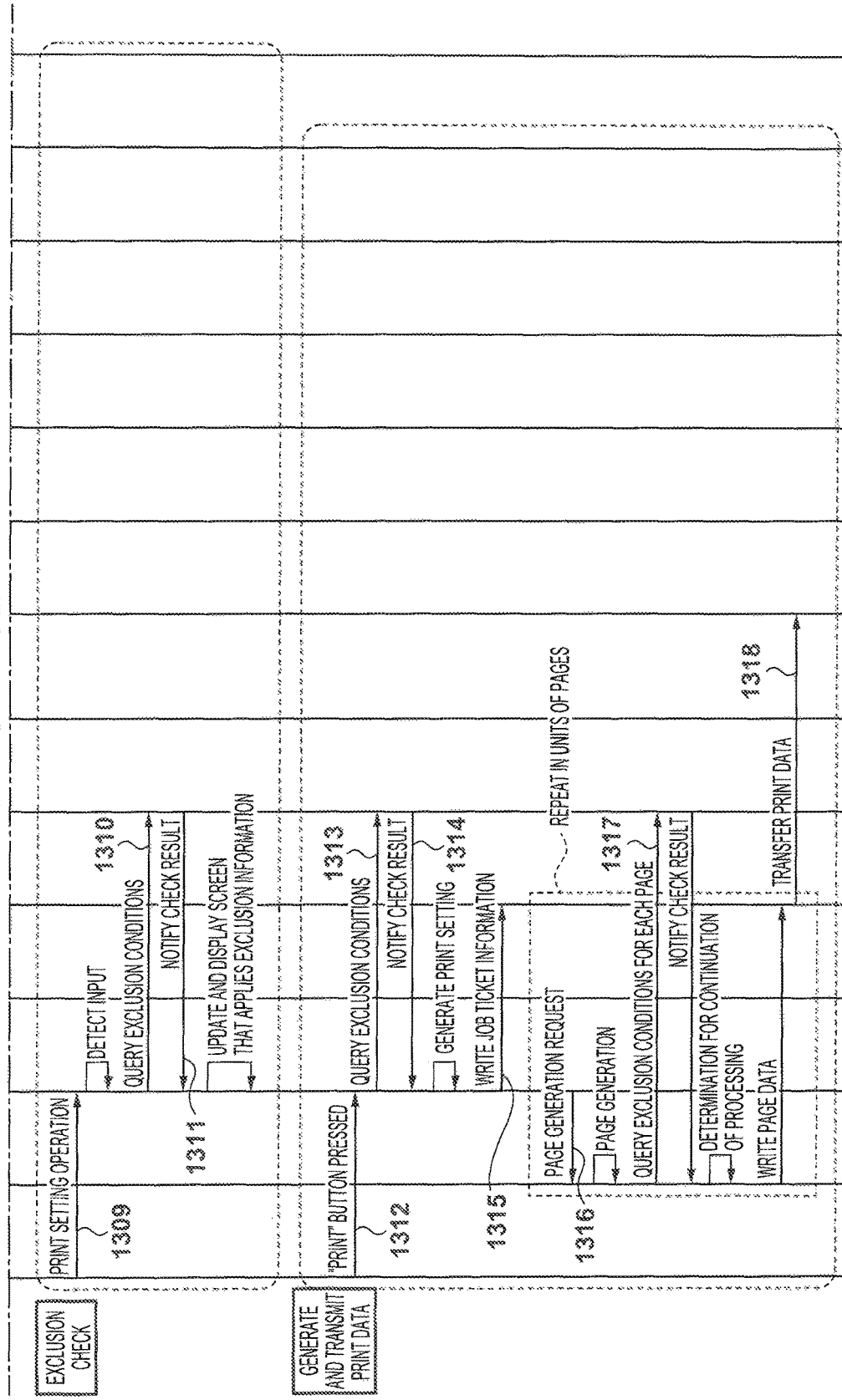

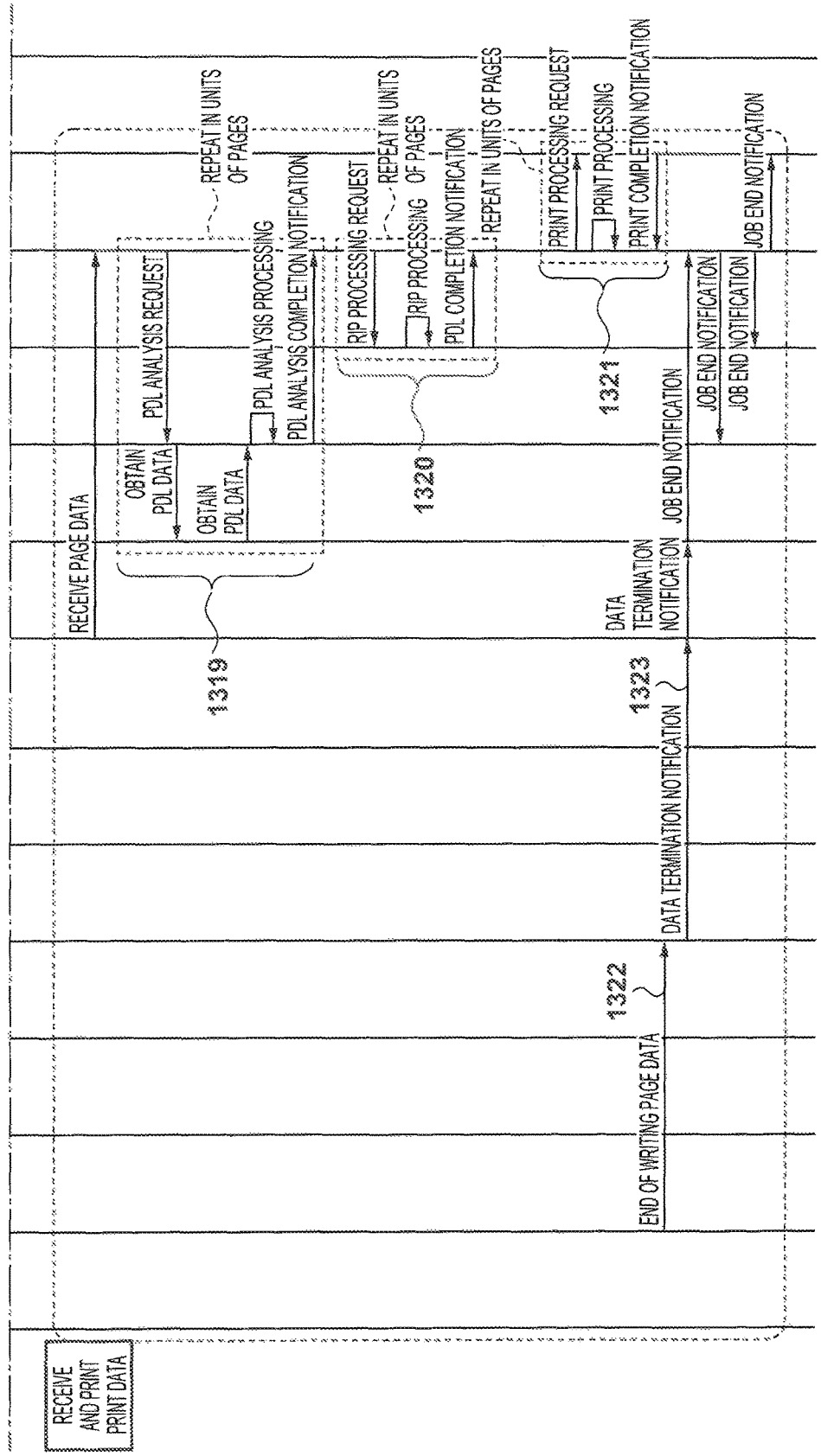

INFORMATION PROCESSING APPARATUS THAT PROVIDES A NOTIFICATION TO A USER IF A PRINTING APPARATUS OPERATES IN A MODE IN WHICH A PRINT SETTING IS SET BY A PRINT APPLICATION EXECUTED IN THE INFORMATION PROCESSING APPARATUS, AND RELATED METHOD OF CONTROLLING THE INFORMATION PROCESSING APPARATUS, AND A STORAGE MEDIUM This application claims the benefit of Japanese Patent Application No. 2017-208512, filed Oct. 27, 2017, which is hereby incorporated by reference herein in its entirety.

BACKGROUND OF THE INVENTION

Field of the Invention

The present invention relates to an information processing apparatus, a method of controlling the information processing apparatus, and a storage medium.

Description of the Related Art

In a case of printing to a sheet fed from a manual feed tray of an image forming apparatus, when a user places a sheet in the manual feed tray, the image forming apparatus detects the sheet by a sheet sensor of the manual feed tray. A user interface (UI) screen for selecting the size, type, and orientation of the sheet is displayed, and a user is prompted for input. With such a method, it is possible to reliably perform setting of sheet settings, but there is a problem of being cumbersome to a user because this screen is displayed each time sheets in the manual feed tray runs out.

To solve this problem, for example, Japanese Patent Laid-Open No. 2012-123728 recites displaying a confirmation screen before feeding from a manual feed tray when printing under print conditions in accordance with page attributes and document attributes written in Page Description Language (PDL), or the like, included in print data.

In a case of deciding a sheet feeding stage, and a type or a size of a sheet to feed from the PDL, or the like, included in print data, however, there are cases in which parameters regarding feeding are insufficient from only information of PDL data, and feeding or print processing cannot be performed appropriately. In other words, in a case of deciding the sheet feeding stage, and the type or the size of a sheet to feed from the PDL, or the like, included in print data, a selection of the sheet feeding stage, and the type or size of the sheet is not performed in advance in the image forming apparatus. In the information processing apparatus that supplies this print data, it is possible to designate the sheet size, its type, a feed source, and the like, via a print setting screen for performing a print setting from an application. In a case in which the size and the feed source are designated by, for example, setting the sheet type to "automatic", however, there is a possibility that printing will be performed on a sheet not intended by a user, due to the type of sheet accommodated in the feed source. In addition, in a case of printing on a specific sheet, such as an envelope or an index sheet, there is a possibility that, due to the width of a flap of the envelope or the width or height of the index, the image forming apparatus will determine that the sheet size does not match with the size of print data, and will cause a print failure or a problem, such as a jam.

SUMMARY OF THE INVENTION

An aspect of the present invention is to eliminate the above-mentioned problem with conventional technology.

A feature of the present invention is to provide a technique whereby, in a case in which a print apparatus is in a mode for printing in accordance with a print setting set by a print application in an information processing apparatus, the print apparatus does not cause a printing problem.

According to a first aspect, the present invention provides an information processing apparatus comprising a memory device that stores a set of instructions, and at least one processor that executes the set of instructions to obtain, from a print apparatus, information indicating a print setting mode to which the print apparatus is set, wherein the print setting mode includes at least a first mode and a second mode, the first mode being a mode in which the print apparatus performs printing in accordance with a print setting set in the print apparatus, and the second mode being a mode in which the print apparatus performs printing in accordance with a print setting set by a print application executed in the information processing apparatus and transmitted from the information processing apparatus to the print apparatus, and wherein, if the print apparatus is set to the second mode, a print setting set by the print application is applied to the print apparatus in preference to a print setting set in the print apparatus, to notify, if the obtained information indicates that the print apparatus is set to the second mode and if a user has not made a print setting for a predetermined setting item in accordance with the print application, a user to prompt to make a setting for the predetermined setting item, and not to notify, if the obtained information indicates that the print apparatus is set to the first mode and even if a user has not made a print setting for the predetermined setting item in accordance with the print application, the user to prompt to make the setting.

According to a second aspect, the present invention provides a method of controlling an information processing apparatus, the method comprising obtaining, from a print apparatus, information indicating a print setting mode to which the print apparatus is set, wherein the print setting mode includes at least a first mode and a second mode, the first mode being a mode in which the print apparatus performs printing in accordance with a print setting set in the print apparatus, and the second mode being a mode in which the print apparatus performs printing in accordance with a print setting set by a print application in the information processing apparatus and transmitted from the information processing apparatus to the print apparatus, and wherein, if the print apparatus is set to the second mode, a print setting set by the print application is applied to the print apparatus in preference to a print setting set in the print apparatus, notifying, if the obtained information indicates that the print apparatus is set to the second mode and if a user has not made a print setting for a predetermined setting item in accordance with the print application, the user to prompt to make a setting for the predetermined setting item, and not notifying, if the obtained information indicates that the print apparatus is set to the first mode and even if a user has not made a print setting for the predetermined setting item in accordance with the print application, the user to prompt to make the setting.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8A to 8C depict views illustrating examples of a print setting screen and a warning screen displayed by a printer driver of the information processing apparatus according to the embodiment.

FIGS. 9A to 9C depict views illustrating examples of a print screen displayed by the information processing apparatus according to the embodiment.

FIGS. 10A and 10B depict views illustrating examples of device configuration information that the image forming apparatus according to the embodiment transmits to the information processing apparatus.

FIG. 11 depicts a view illustrating an example of print data generated by the print application of the information processing apparatus according to the embodiment.

FIGS. 12A to 12C depict views illustrating examples of sheet feeding stage setting screens displayed on an operation unit of the image forming apparatus according to the embodiment.

FIGS. 13A through 13C are sequence diagrams for describing an exchange of data between the image forming apparatus and the information processing apparatus according to the embodiment.

DESCRIPTION OF THE EMBODIMENTS

Embodiments of the present invention will be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
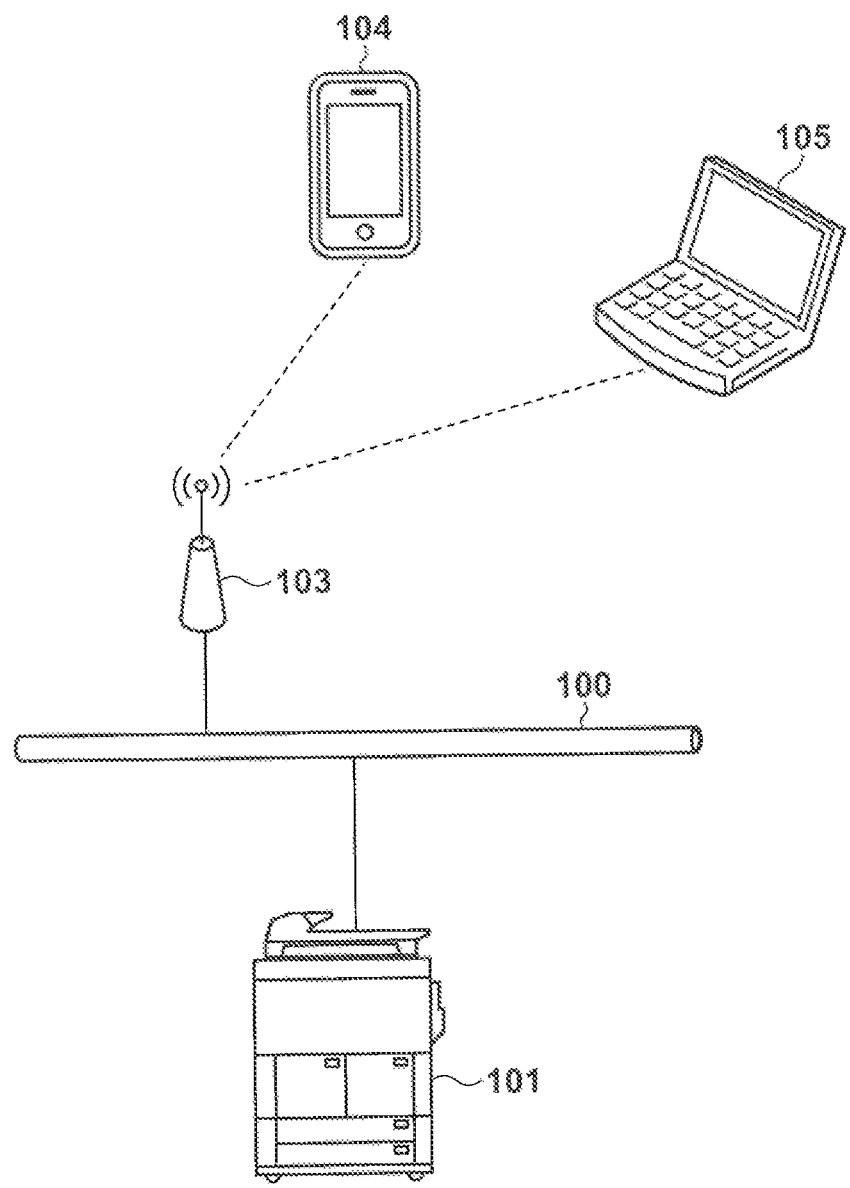
FIG. 1 depicts a view for describing a print system according to an embodiment of the present invention.

FIG. 1 depicts a view for describing a print system according to the embodiment of the present invention.

On a local area network (LAN) 100, an image forming apparatus 101, and an access point (AP) 103 are communicably connected to each other. In the present embodiment, the image forming apparatus 101 is described as an example of a print apparatus. In addition, a mobile terminal 104 and a personal computer (PC) 105 are described as examples of a print control apparatus. An information processing apparatus, such as the mobile terminal 104 and the PC 105, is capable of mutually communicating with the image forming apparatus 101 on the LAN 100 via the AP 103. Note that the information processing apparatus, which is a PC 105, or the like, may be connected to the LAN 100 by wire in accordance with a LAN cable. In addition, in the present embodiment, the above configuration is described as an example of a print system, but the present invention is not limited to this, and one or more information processing apparatuses and print apparatuses may be communicably connected via a network. Note that, in the following description, the mobile terminal 104 and the PC 105 are described as information processing apparatuses 104 and 105, and, because both of the information processing apparatuses 104 and 105 have similar functions, a description is given for the information processing apparatus 105 as a representative of these.

Next, a description is given regarding the image forming apparatus 101 according to the embodiment. The image forming apparatus 101 has a print function for printing an image on a sheet, and executes print processing based on print data received via a network.

Figure 2A:
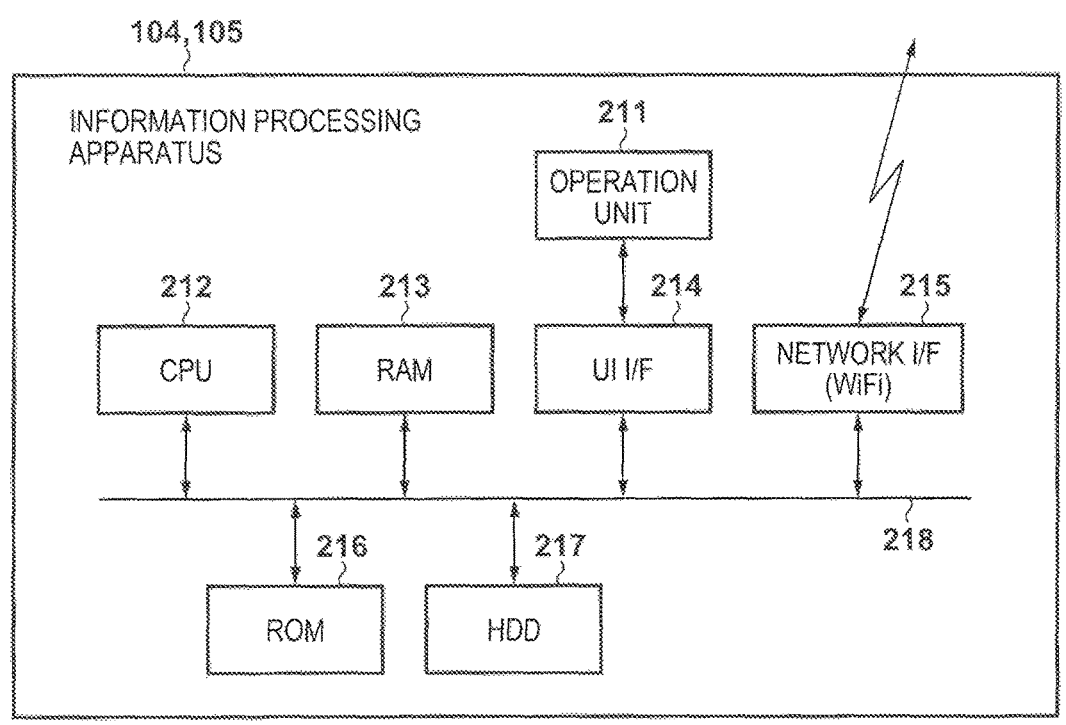
FIG. 2A is a block diagram for describing a hardware configuration of an information processing apparatus according to the embodiment.
Figure 2B:
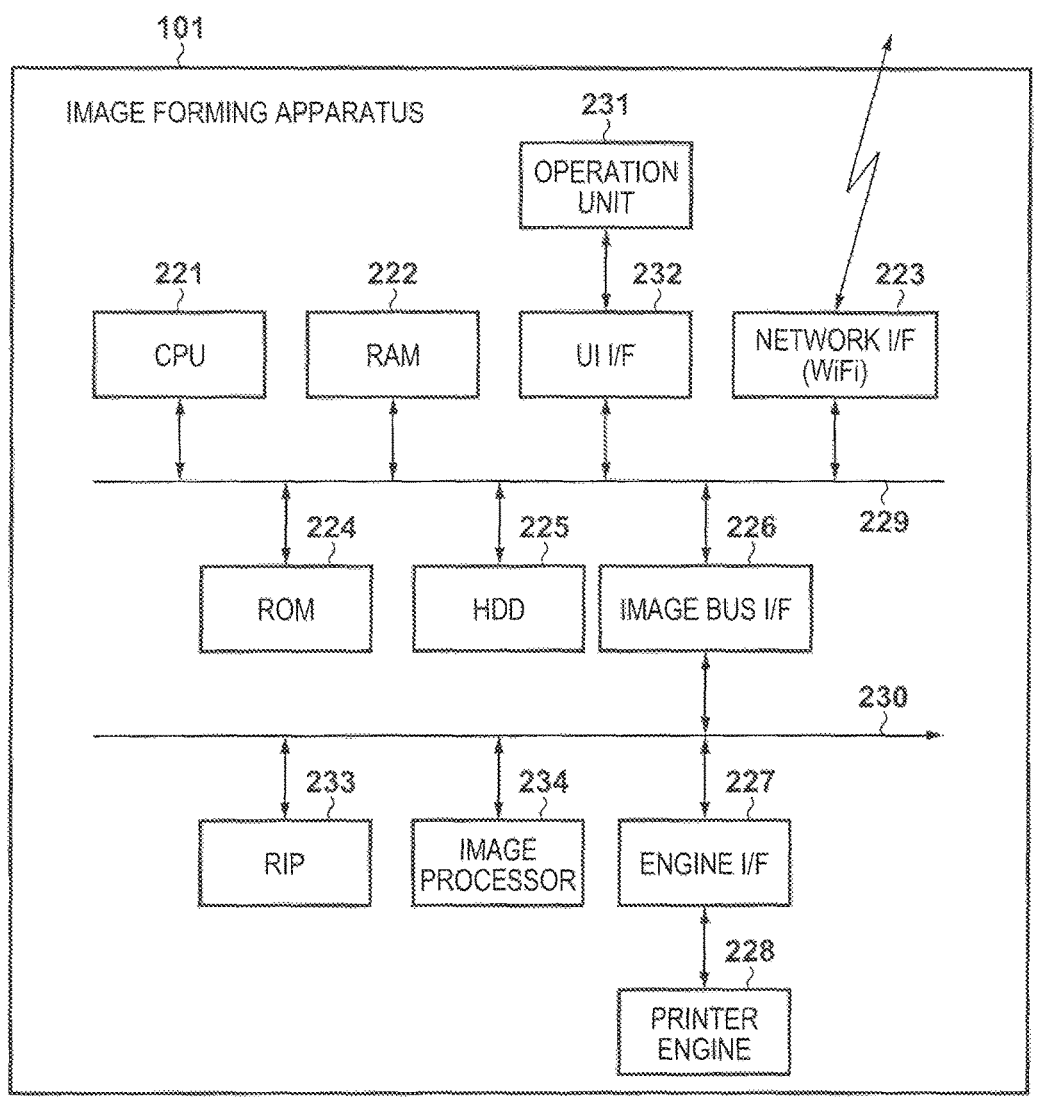
FIG. 2B is a block diagram for describing a hardware configuration of an image forming apparatus according to the embodiment.

FIG. 2A is a block diagram for describing a hardware configuration of the information processing apparatus 105 according to the embodiment. In addition, FIG. 2B is a block diagram for describing a hardware configuration of the image forming apparatus 101 according to the embodiment.

In FIG. 2A, a central processing unit (CPU) 212, a random access memory (RAM) 213, a user interface (UI) 214, a network interface (I/F) 215, a read only memory (ROM) 216, a hard disk drive (HDD) 217, and the like, are connected to a bus 218 of the information processing apparatus 105, and these communicate with one another. The ROM 216 stores a program and various parameters necessary for execution by and activation of the information processing apparatus 105. At a time of activation of the information processing apparatus 105, the CPU 212 executes a boot program stored in the ROM 216 to deploy a program stored in the HDD 217 to the RAM 213, and executes this deployed program to control operation of the information processing apparatus 105. This program includes functions for a print application 301, a page data generation module 304, a print data validation module 306, a device configuration exclusion control module 305, a print setting generation module 303, a print screen display module 302, and the like, which are described below with reference to FIG. 3. An operation unit 211 has a display unit that has a touch panel function, a keyboard, or the like, and is connected to the bus 218 via the UI I/F 214.

Figure 3:
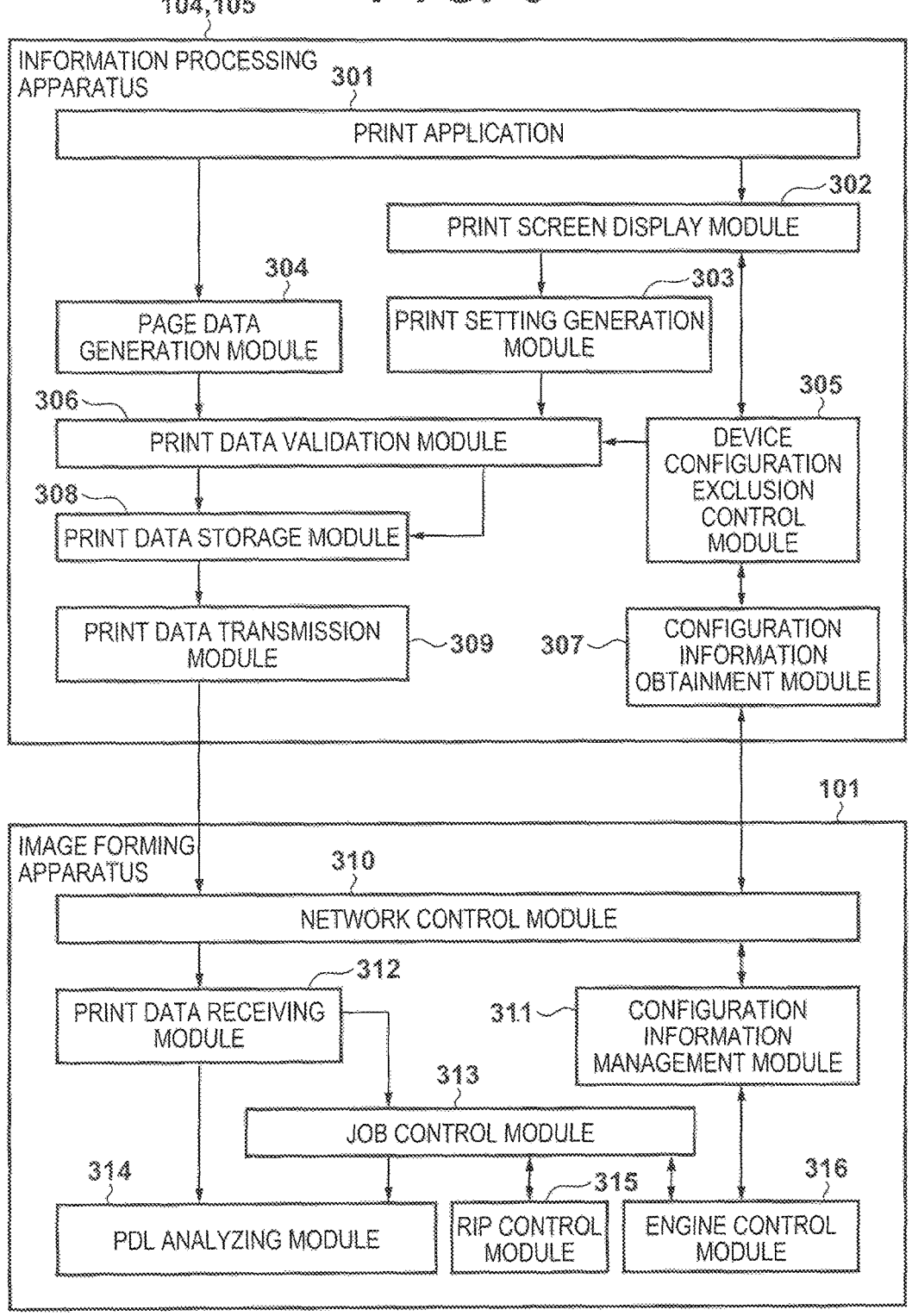
FIG. 3 is a functional block diagram for describing a software configuration of the image forming apparatus and the information processing apparatus according to the embodiment.

Next, a description is given for a configuration of the image forming apparatus 101. A CPU 221, a RAM 222, a network I/F (interface), 223, a ROM 224, an HDD 225, a UI 232, and the like, are connected to a bus 229 of the image forming apparatus 101, and these communicate with one another. The ROM 224 stores a program and various parameters necessary for execution by and activation of the image forming apparatus 101. At a time of activation of the image forming apparatus 101, the CPU 221 executes a boot program stored in the ROM 224 to deploy a program stored in the HDD 225 to the RAM 222, and executes this deployed program to control operation of the image forming apparatus 101. In addition, the HDD 225 temporarily stores PDL data received via a network, and is accessed from respective modules as a data swap region for raster image processing or other image processing. In addition, the bus 229 accesses an engine I/F 227 connected to an image bus 230, via an image bus I/F 226. Software for a network control module 310, a configuration information management module 311, and the like, which are described later with reference to FIG. 3, is held in the HDD 225. The network I/F 223 controls communication with the information processing apparatus 105 via a network. Upon receiving a request for configuration information from the information processing apparatus 105, the CPU 221 generates device configuration information 1000 (FIGS. 10A and 10B) from information stored in the ROM 224 or the HDD 225, information of the printer engine 228 that is obtained via the engine I/F 227, and the like, and notifies the device configuration information 1000 to the information processing apparatus 105.

An operation unit 231 has a display panel provided with a touch panel function, a key operation unit provided with a physical key, and accepts an operation by a user, and displays various information or a message to a user. The UI 232 controls an interface between the bus 229 and the operation unit 231. A raster image processor (RIP) 233 expands page description language (PDL) data into bitmap data. An image processor 234 performs image processing on image data that is to be output to the printer engine 228, and makes a conversion to image data in accordance with characteristics of the printer engine 228.

FIG. 3 is a functional block diagram for describing a software configuration of the information processing apparatus 105 and the image forming apparatus 101 according to the embodiment.

The information processing apparatus 105 has the print application 301, which is for generating print data, such as a Web browser or an email client. The print screen display module 302 generates a print screen to be displayed in a case of printing from the print application 301. The device configuration exclusion control module 305 stores exclusion information for functions or device configuration information of the image forming apparatus 101 that is necessary for the creation of a display screen. For information held by the device configuration exclusion control module 305, based on a request to display a print screen from the print application 301 or a request to reobtain device information from the print screen, a configuration information obtainment module 307 obtains exclusion control information and configuration information from the configuration information management module 311 of the image forming apparatus 101 via a network.

When a user of the information processing apparatus 105 operates a print settings screen 810 (FIG. 8A), for example, to press a print button 811, the print setting generation module 303 converts setting values of this screen to print ticket information for print data. Furthermore, by the pressing of the print button 811, the print application 301 causes print data to be sequentially generated by the page data generation module 304 in units of pages. Print ticket information generated by the print setting generation module 303 and the page data generation module 304 is temporarily stored by the print data validation module 306. After confirming whether the print ticket information conforms to an exclusion rule of the device configuration exclusion control module 305, it is spooled to a print data storage module 308. A print data transmission module 309 transmits print data stored in the print data storage module 308 to the image forming apparatus 101 as a print job.

Next, a description is given regarding a software configuration of the image forming apparatus 101.

Internet Printing Protocol (IPP) printing or a Web Services for Device (WSD) print service is operating on the network control module 310. A print data receiving module 312 temporarily stores an IPP or a WSD print job received by the network control module 310, passes print ticket information of the print job to a job control module 313, and passes a PDL data portion of the print job to a PDL analyzing module 314. The job control module 313 cooperates with the PDL analyzing module 314 and a RIP control module 315 to perform analysis of the received PDL data, RIP processing, and print processing for a page that has been subject to RIP. The configuration information management module 311 obtains information of a feed/discharge accessory connected to an engine control module 316, obtains information of a finishing function that can be used, and the like, and notifies this information to the configuration information obtainment module 307 of the information processing apparatus 101.

Figure 4:
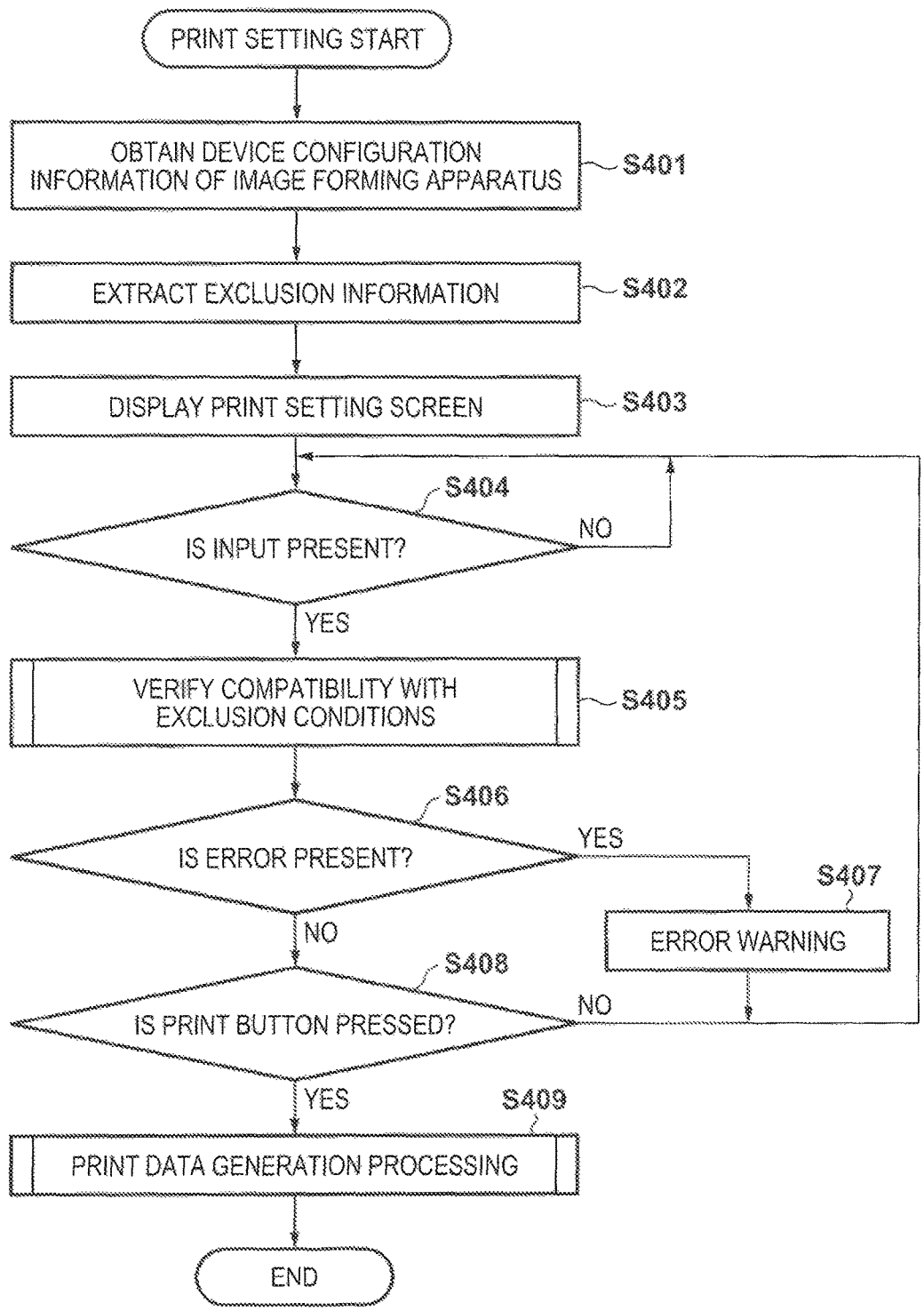
FIG. 4 is a flowchart for describing processing in which the information processing apparatus according to the embodiment starts generation of print data by displaying a print setting screen.

FIG. 4 is a flowchart for describing processing in which the information processing apparatus 105 according to the embodiment starts generation of print data by displaying a print setting screen. Note that this processing is achieved by the CPU 212 executing a program that has been deployed to the RAM 213. For this processing, a description is given for processing up until generation of print data is started in accordance with the print application 301 calling a print function, displaying a print settings screen 810 illustrated in FIG. 8A for example, and the print button 811 in this screen being pressed.

First, in step S401, the CPU 212 obtains the device configuration information 1000 (FIGS. 10A and 10B) of the image forming apparatus 101 in order to display a print setting screen on the operation unit 211. This device configuration information 1000 is described later with reference to FIGS. 10A and 10B. Note that, at this point, it is determined whether the device configuration information 1000 of the image forming apparatus 101 is cached, and the device configuration information 1000 is obtained from the image forming apparatus 101 if it is not cached. Next, the processing advances to step S402, and the CPU 212 extracts exclusion information included in the device configuration information 1000. Next, the processing advances to step S403, and the CPU 212 displays the print setting screen in a state in which the exclusion information has been reflected to UI components for respective functions displayed on the print setting screen. A display example in which the exclusion information is reflected is described later.

Next, the processing advances to step S404, and the CPU 212, upon receiving an input with a print setting by accepting an operation by a user via the print setting screen, advances the processing to step S405. In step S405, the CPU 212, based on input setting values, makes a comparison with exclusion information held by the device configuration exclusion control module 305, and verifies whether the input setting values correspond to the exclusion information. The processing then proceeds to step S406, and the CPU 212, upon determining that the input setting values correspond to the exclusion information, determines that the input is in error, advances the processing to step S407, displays an error warning screen on the operation unit 211, and advances to step S404.

Meanwhile, when the CPU 212 determines in step S406 that the input setting values do not correspond to the exclusion information, the processing advances to step S408, and the CPU 212 determines whether or not the print button 811 has been pressed. The processing returns to step S404 in a case in which there is an input other than the print button 811. The processing advances to step S409 when it is determined that a user pressed the print button 811, and the CPU 212 generates print ticket information for a print job, and performs processing for generating print data.

Next, details of the processing of step S405 will be described with reference to the flowchart of FIG. 5.

Figure 5:
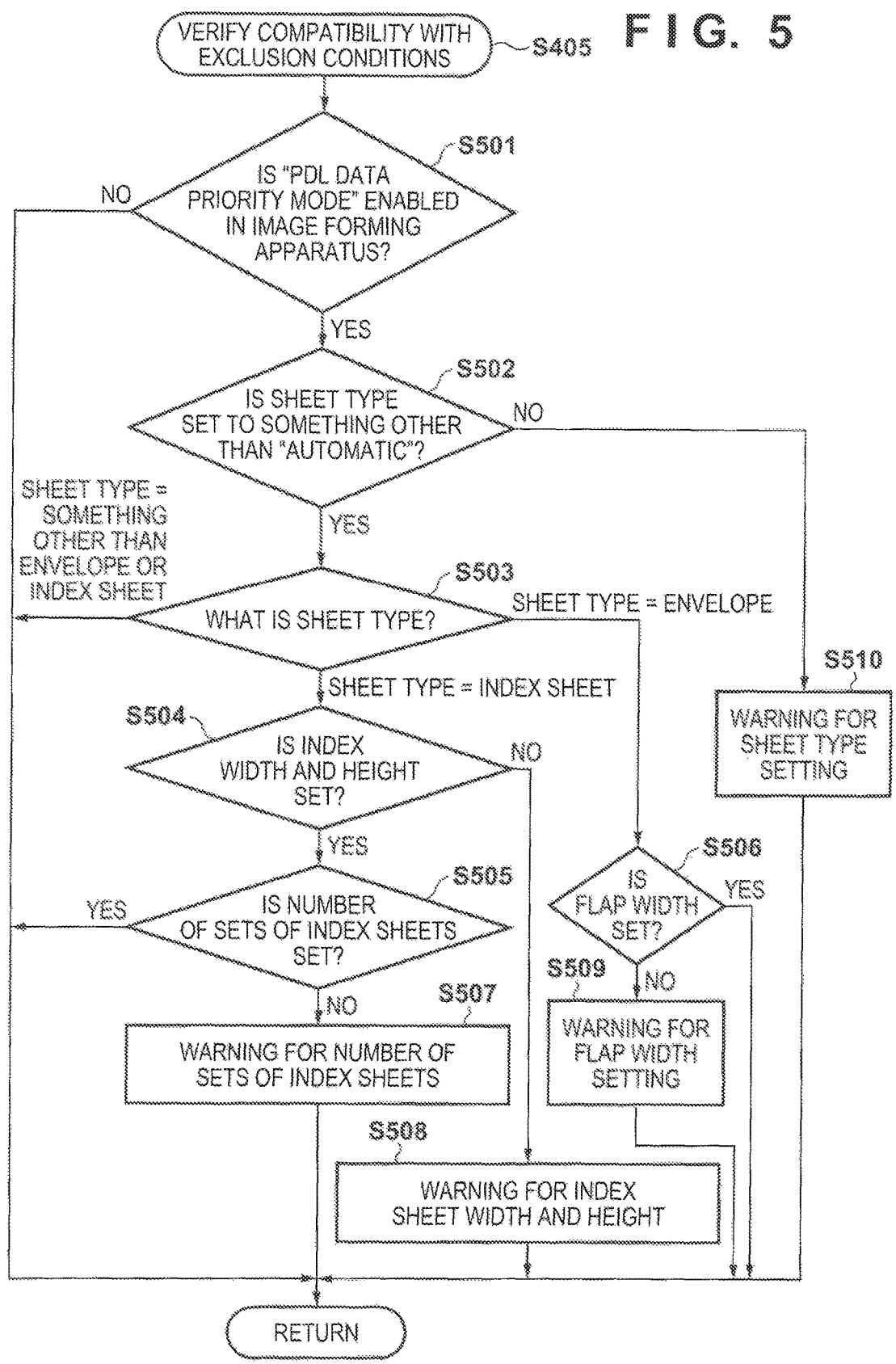
FIG. 5 is a flowchart for describing processing for verifying compatibility with exclusion information of step S405 of FIG. 4.

FIG. 5 is a flowchart for describing processing for verifying compatibility with exclusion information of step S405 in FIG. 4.

First, in step S501, the CPU 212 determines whether or not a "PDL data priority mode" is enabled in the image forming apparatus 101. The "PDL data priority mode" is a mode for making print settings from page attributes and document attributes written in the PDL language of print data received from the information processing apparatus 105, and not for print settings in accordance with a sheet size or type set by a user in the image forming apparatus 101. When the "PDL data priority mode" is enabled the processing proceeds to step S502, and when it is not enabled the processing ends.

Figure 8A:
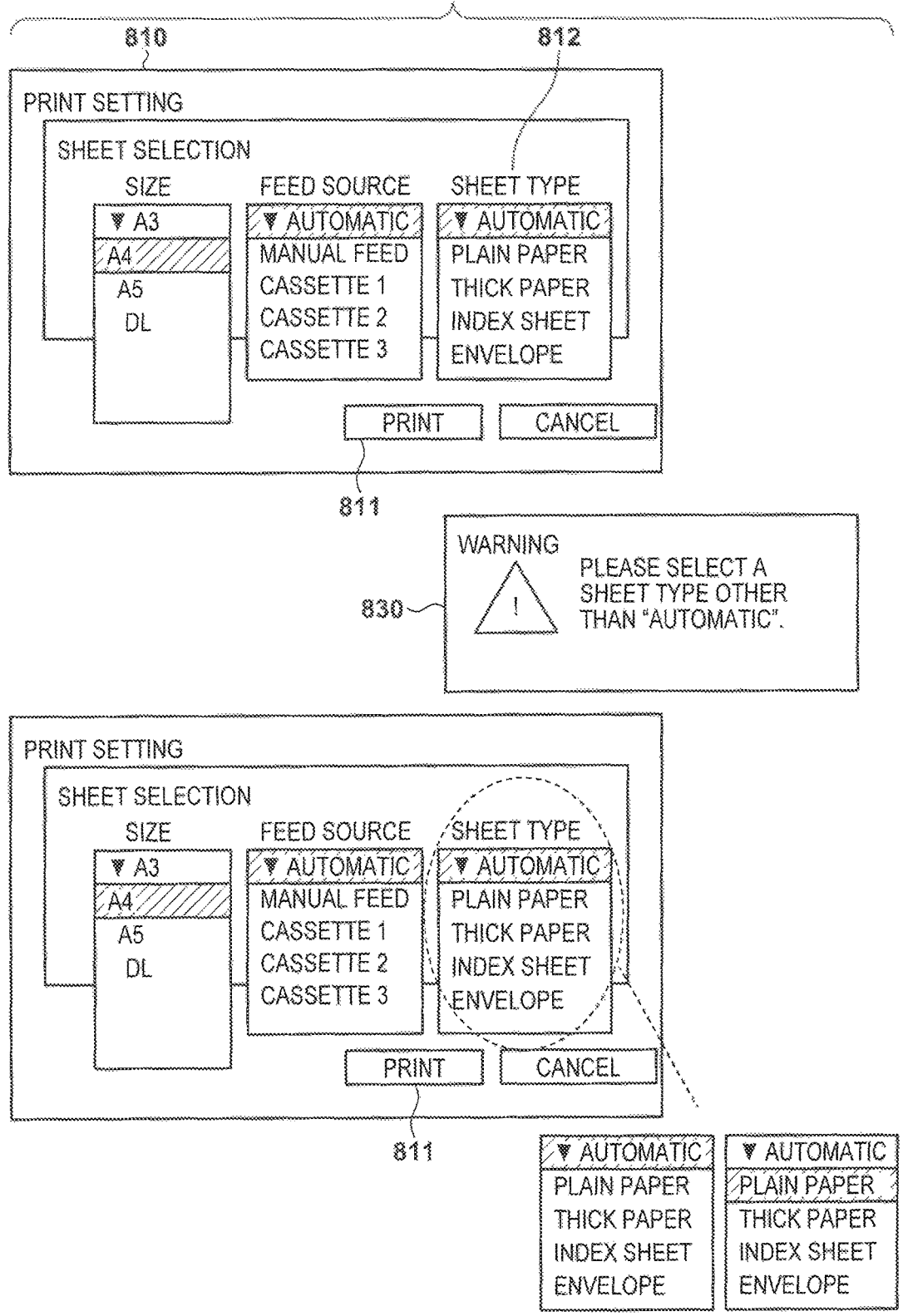

In step S502, the CPU 212 determines whether or not something other than "automatic", for example "plain paper" or "thick paper", has been selected and set for the sheet type in the print settings screen 810 of FIG. 8A, for example. When it is determined here that "automatic" is set to the sheet type, the processing proceeds to step S510, and the CPU 212 sets a warning flag for the sheet type, and ends this processing. By this arrangement, a user can set the sheet type in the print setting screen. Note that configuration may be taken such that, when the operation mode of the image forming apparatus 101 can be discriminated in advance, "automatic" may not able to be selected from a menu for the sheet type of a print setting screen. In such a case, there ceases to be a need to set the warning flag and to display a warning screen.

When the CPU 212 determines in step S502 that something other than "automatic" is set to the sheet type, the processing advances to step S503, and the set sheet type is determined. Because a specific sheet type, such as "envelope" or "index sheet," is treated as a problem, the processing ends in the case of other sheet types. When the CPU 212 determines in step S503 that the sheet type is "index sheet", the processing advances to step S504, and the processing advances to step S506 when the sheet type is "envelope". In step S504, the CPU 212 determines whether or not an index width, as an example of information associated with an index sheet, is set in a screen 840 of FIG. 8B, which is described later, for example. When it is determined that this is set, the processing advances to step S505, and the CPU 212 determines whether or not the number of sets of index sheets is set in the screen 840 of FIG. 8B, which is described later, for example. When it is determined that the number of sets of index sheets is set, this processing ends.

Meanwhile, when the CPU 212 determines in step S504 that the index width of the index sheet is not set, the processing advances to step S508, a warning flag for prompting input of the index width is turned on, and this processing ends. In addition, when the CPU 212 determines in step S505 that the number of sets of index sheets is not set, the processing advances to step S507, and the CPU 212 turns on the warning flag for prompting input of the number of sets of index sheets, and this processing ends.

In addition, when the CPU 212 determines step S503 that the sheet type is set to "envelope", the processing proceeds to step S506. In step S506, the CPU 212 determines whether or not a flap width, as an example of information associated with an envelope sheet type, is set in a setting field of a screen 860 of FIG. 8B, for example. When it is determined here that the flap width is not set, the processing proceeds to step S509, and the CPU 212 turns on a warning flag for prompting input of the flap width, and ends this processing.

Meanwhile, when it is determined in step S506 that the flap width is set, this processing ends. Based on the warning flags that are set to ON, the CPU 212 displays corresponding warning screens, for example screens 850 and 870 of FIG. 8B, on the operation unit 211.

Figure 6:
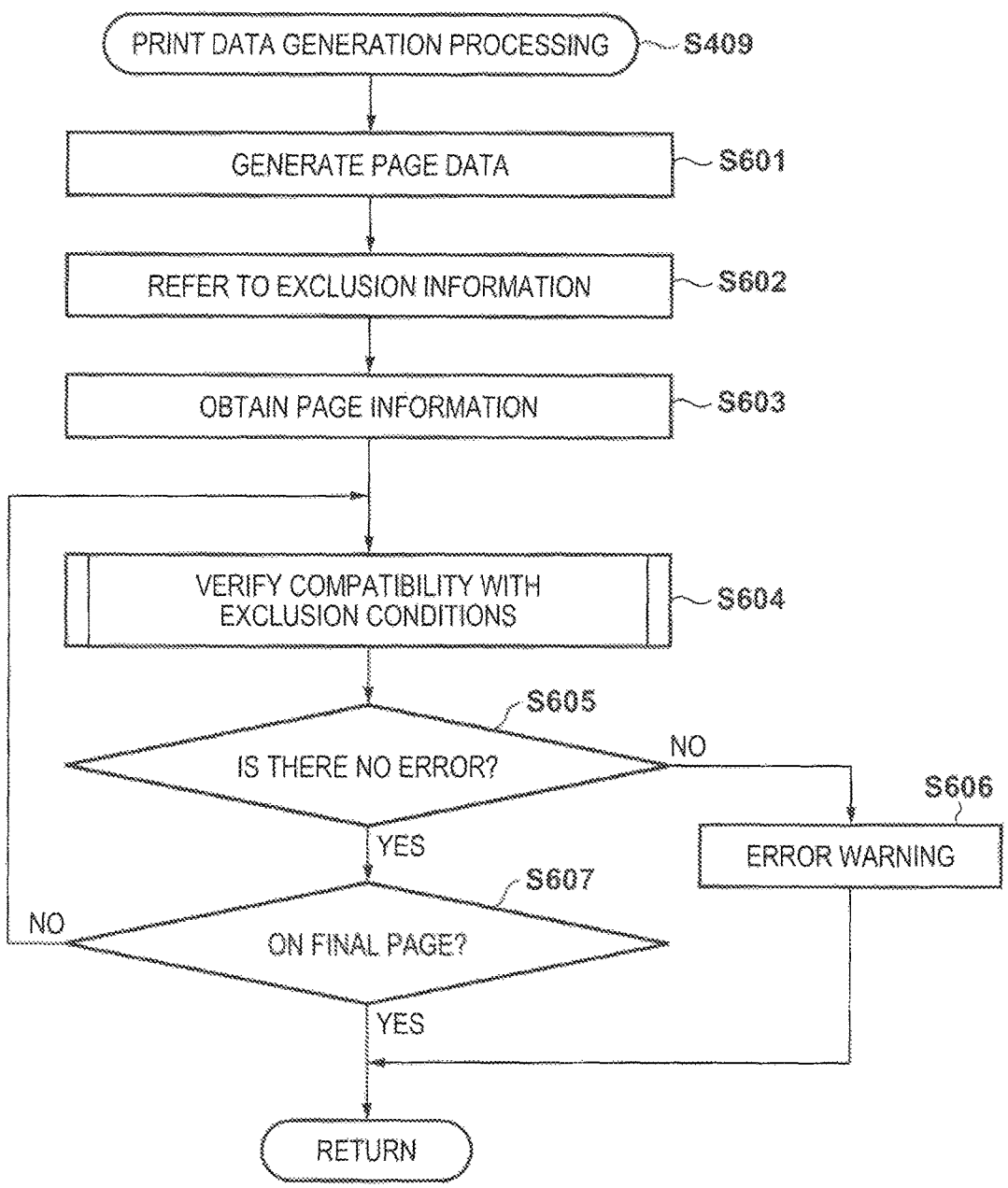
FIG. 6 is a flowchart for describing processing for generating print data of step S409 of FIG. 4.

FIG. 6 is a flowchart for describing processing for generating print data of step S409 of FIG. 4.

In step S601, the CPU 212 generates page data based on the print data. Next, the processing advances to step S602, and the CPU 212 refers to the exclusion information obtained in step S402. Next, the processing advances to step S603, and the CPU 212 obtains one page's page data from the generated page data. The processing advances to step S604, and the CPU 212 makes a comparison with the exclusion information, and verifies compatibility of the page. Details of the processing of step S604 will be described later with reference to the flowchart of FIG. 7. The processing advances to step S605, and, when the CPU 212 determines that this page is compatible, the processing advances to step S607, and otherwise advances to step S606, where the warning screens 830, 850, and 870 of FIGS. 8A and 8B, for examples, are displayed, and this processing ends. In step S607, the CPU 212 determines whether or not the page is the final page, and this processing ends when this is the case, and, when this page is not the final page, the processing returns to step S603, and previously described processing is repeated.

Figure 7:
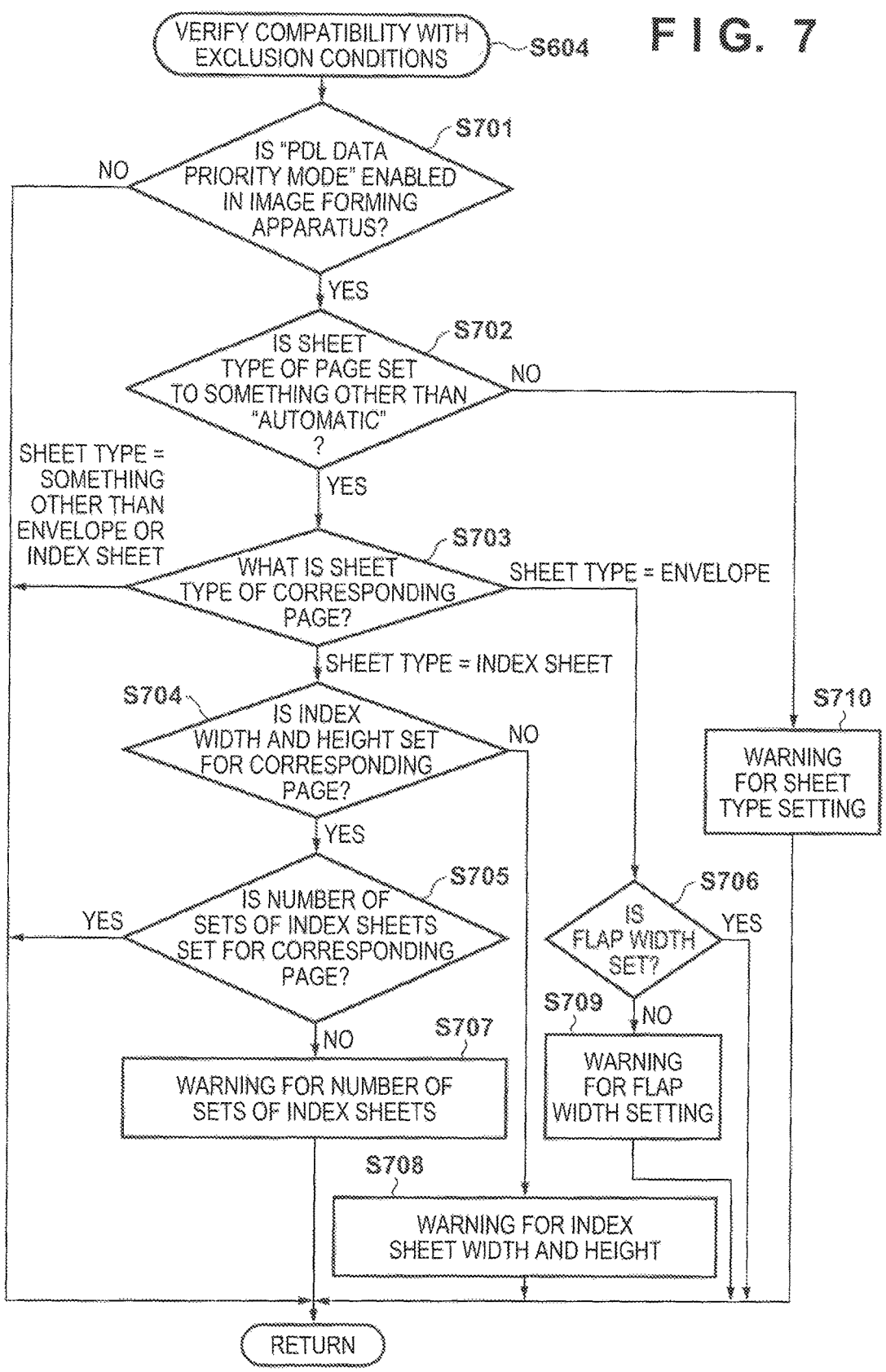
FIG. 7 is a flowchart for describing processing for verifying compatibility of a page by making a comparison with exclusion information, in step S604 of FIG. 6.

FIG. 7 is a flowchart for describing processing for verifying compatibility of a page by making a comparison with exclusion information, in step S604 of FIG. 6. Because the flowchart of FIG. 7 is substantially the same as the flowchart of FIG. 5, which is described above, except for verification being performed in units of pages, a brief description is given.

First, in step S701, the CPU 212 determines whether or not the "PDL data priority mode" is enabled in the image forming apparatus 101. When it is enabled the processing proceeds to step S702, and, when it is not enabled the processing ends. In step S702, the CPU 212 determines whether or not something other than "automatic" is selected and set for the sheet type of the page. When it is determined here that "automatic" is set to the sheet type of the page, the processing proceeds to step S710, and the CPU 212 sets a warning flag for the sheet type, and ends this processing. By this arrangement, a user can set the sheet type in the print setting screen.

When the CPU 212 determines in step S702 that something other than "automatic" is set to the sheet type of the page, the processing advances to step S703, and the sheet type set for the page is determined. Because a case in which the sheet type is "envelope" or "index sheet" is treated as a problem, the processing ends in the case of other sheet types. When the CPU 212 determines in step S703 that the sheet type of the page is "index sheet", the processing advances to step S704, and the processing advances to step S706 when the sheet type of the page is "envelope". In step S704, the CPU 212 determines whether or not the index width of the index sheet for the page is set, in other words whether or not an initial value=0 is not the case. When it is determines that the index width is set, the processing advances to step S705, and the CPU 212 determines whether or not the number of sets of index sheets for the page is set, in other words whether or not an initial value=0 is not the case. When it is determined that the number of sets of index sheets is set, this processing ends.

Meanwhile, when the CPU 212 determines in step S704 that the index width of the index sheet of the page is not set, the processing advances to step S708, a warning flag for prompting input of the index width is turned on, and this processing ends. In addition, when the CPU 212 determines in step S705 that the number of sets of index sheets is not set, the processing advances to step S707, and the CPU 212 turns on the warning flag for prompting input of the number of sets of index sheets, and this processing ends.

In addition, when the CPU 212 determines in step S703 that the sheet type of the page is set to "envelope", the processing proceeds to step S706. In step S706, the CPU 212 determines whether or not the flap width is set, in other words whether or not an initial value=0 is not the case. When it is determined that the flap width is not set, the processing advances to step S709, and the CPU 212 turns on a warning flag for prompting input of the flap width, and this processing ends. Meanwhile, when it is determined in step S706 that the flap width is set, this processing ends. Based on the warning flags that are set to ON, the CPU 212 displays corresponding warning screens, for example screens 830, 850 and 870 of FIGS. 8A and 8B, on the operation unit 211.

FIGS. 8A to 8C depict views illustrating examples of a print setting screen and a warning screen displayed by a printer driver of the information processing apparatus 105 according to the embodiment.

A user sets the sheet size, the sheet type, and a feed source for a time of printing on the print settings screen 810, and then presses the print button 811. The warning screen 830 is displayed in a case in which, when the image forming apparatus 101 is in the "PDL data priority mode", a user selects "automatic" for the sheet type on the setting screen 810 and presses the print button 811. Selection of something other than "automatic" for the sheet type is prompted on the warning screen 830.

In addition, the warning screen 850 is displayed in a case in which, when the image forming apparatus 101 is in the "PDL data priority mode", the print button 811 is pressed with settings as shown on the print screen 840. In other words, it is displayed in a case where "index sheet" is selected for sheet type, and the print button 811 is pressed without the input of appropriate values for an input field 841 for setting the width and the number of sets for an index sheet. Settings of the width and number of sets for an index sheet are prompted on the warning screen 850.

In addition, the warning screen 870 is displayed in a case in which, when the image forming apparatus 101 is in the "PDL data priority mode", the print button 811 is pressed with settings as shown on the print screen 860. In other words, it is displayed in a case where "envelope" is selected for sheet type, and the print button 811 is pressed without the input of appropriate values for an input field 861 for the flap width of an envelope. Setting of the flap width of an envelope is prompted on the warning screen 870.

In addition, in this embodiment, the device configuration information 1000 is obtained from the image forming apparatus 101 each time the print screen is opened from the print application 301. Because a combination of the image forming apparatus 101 and the information processing apparatus 105, which is a desktop PC, or the like, is fixed, however, the device configuration information does not need to be obtained at every instance of displaying the print screen. For example, a user selects a printer icon from a device and printer screen 880, and selects printer properties. By this arrangement, a printer properties screen 890 is displayed. A configuration may be taken to obtain the exclusion information and the device configuration information from the image forming apparatus 101 when a user presses a "device configuration information obtainment" button 891 on the printer properties screen 890.

Figure 9B:
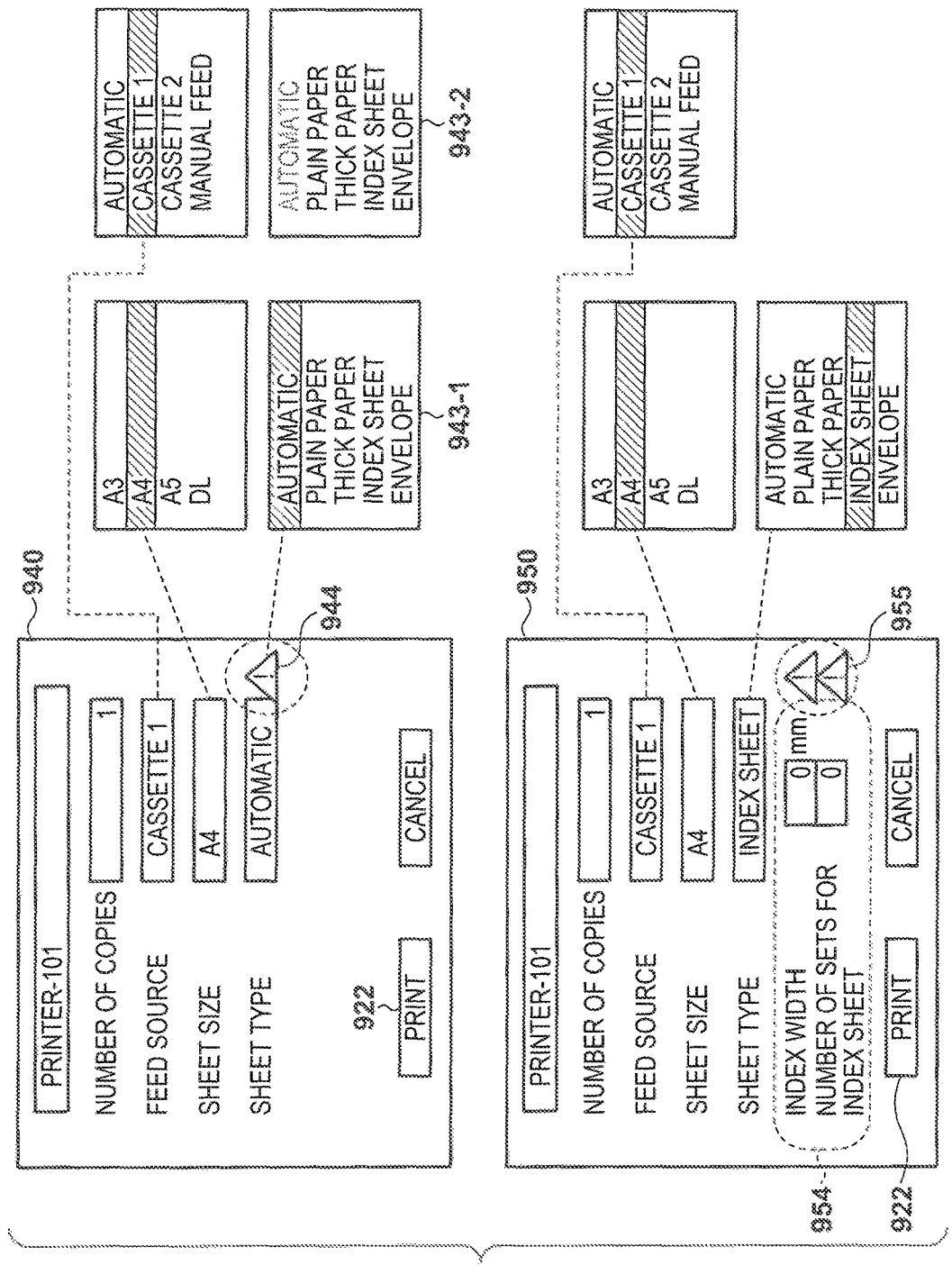

FIGS. 9A to 9C depict views illustrating an example of a print screen displayed by the information processing apparatus 105 according to the embodiment.

In FIG. 9A, a user selects "Print" from a print menu 911 of a print screen 910 displayed by the print application 301. By this arrangement, the print screen 920 is displayed on the operation unit 211. While the print screen 920 is being displayed, the configuration information obtainment module 307 collects device configuration information from the image forming apparatus 101. Although a name of a printer is not displayed on a printer selection menu 921 before the device configuration information is collected from the image forming apparatus 101, when the collection completes, names of printers for which the configuration information could be obtained are displayed as selectable printers in a list 931, as illustrated by a print screen 930.

A print screen 940 of FIG. 9B is a screen for designating the number of copies, a feed source, a sheet size, and a sheet type with respect to a printer (Printer-101) (corresponds to the image forming apparatus 101) selected in the print screen 930. Here, the number of copies is set to "1", the feed source is set to "cassette 1", the sheet size is set to "A4", and the sheet type is set to "automatic". When the image forming apparatus 101 that is selected here is in the "PDL data priority mode", if a print button 922 is pressed on the print screen 940, a warning mark 944 is displayed. This is displayed in accordance with the warning for the sheet type setting being set to ON in step S510 (FIG. 5) and in step S710 (FIG. 7), which are described earlier. Note that configuration may be taken such that, in the print screen 940 at this point, when the image forming apparatus 101 is in the "PDL data priority mode", a menu for selecting the sheet type is set to a menu screen in which "automatic" cannot be selected as in a menu 943-2, instead of a menu 943-1.

A print screen 950 of FIG. 9B is a screen for designating the number of copies, a feed source, a sheet size, and a sheet type with respect to a printer (Printer-101) (corresponds to the image forming apparatus 101) selected in the print screen 930. Here, the number of copies is set to "1", the feed source is set to "cassette 1", the sheet size is set to "A4", and the sheet type is set to "index sheet". When the image forming apparatus 101 that is selected here is in the "PDL data priority mode", if the print button 922 is pressed on the print screen 950, warning marks 955 are displayed. The warning marks 955 are because, while "index sheet" is selected in the sheet type, appropriate values in the setting input width 954 relating to the width of index sheet and the number of sets of index sheets have not been input. This is displayed because a warning for the setting of the width or height of the index sheet is set to ON in step S507, step S508 (FIG. 5) or step S707, step S708 (FIG. 7).

A print screen 960 of FIG. 9C is a screen for designating the number of copies, a feed source, a sheet size, and a sheet type with respect to a printer (Printer-101) (corresponds to the image forming apparatus 101) selected in the print screen 930. Here, the number of copies is set to "1", the feed source is set to "manual feed", the sheet size is set to "A4", and the sheet type is set to "envelope". When the image forming apparatus 101 that is selected here is in the "PDL data priority mode", if the print button 922 is pressed on the print screen 960, a warning mark 965 is displayed. The warning mark 965 is because, while "envelope" is selected in the sheet type 963, an appropriate value has not been input in an input field 964 regarding an envelope flap width of the print screen 960. This is displayed in accordance with the warning for the flap width setting being set to ON in step S509 (FIG. 5) and step S709 (FIG. 7).

FIGS. 10A and 10B depict views illustrating an example of the device configuration information 1000 that the image forming apparatus 101 according to the embodiment transmits to the information processing apparatus 105. Note that this information is defined in an extensible markup language (XML) format.

Reference numerals 1010 through 1070 of FIG. 10A denote functions provided by the image forming apparatus 101, as recorded by "Feature" in XML tags. In addition, reference numerals 1080 through 1100 of FIG. 10B denote exclusion information for prohibiting combinations, as recorded by "InvalidCombination" in tags.

Reference numeral 1010 describes "FeedType" (sheet feeding stage) information that can be used by the image forming apparatus 101. Here, a description is given for "Manual" (a manual feed tray) as a representative example. Usually a plurality of sheet feeding stages are written in a list. Reference numeral 1020 describes "PageMediaSize" (sheet size) information that can be used by the image forming apparatus 101. A description is given here for an "A3" size (width 297 mm, and height 420 mm) as a representative example. Conventionally, all sheet sizes that the image forming apparatus 101 can feed are written in a list. Reference numeral 1030 describes "PageMediaType" (sheet type) information that can be used by the image forming apparatus 101. Listed in the sheet types are "AutoSelect, Plain, Bond, TabStockPreCut, and EnvelopePlain" (in other words, automatic, plain paper, thick paper, index sheet, and envelope). Reference numeral 1040 describes that "PDL data priority mode" (OverwriteInputBinSetting) has been set on a UI screen of the image forming apparatus 101. Reference numeral 1050 describes that a maximum value for the flap width of an envelope handled by the image forming apparatus 101 is 50 mm. Reference numeral 1060 describes that a maximum value for the width of an index sheet handled by the image forming apparatus 101 is 50 mm. Reference numeral 1070 describes the number of sets of index sheets handled by the image forming apparatus 101 is at maximum 10. This is the function information of the image forming apparatus 101.

Next, in the exclusion information 1080, reference numeral 1081 describes that the flap width of an envelope is a value that is not 0 mm when the "PDL data priority mode" is enabled. In the exclusion information 1090, reference numeral 1091 describes that the flap width of an index sheet is a value that is not 0 mm. In the exclusion information 1100, reference numeral 1101 describes that the number of sets of index sheets is a value that is not 0. Furthermore, in the exclusion information 1110, reference numeral 1111 describes that the sheet type is something other than "automatic". Something that corresponds with these conditions becomes a target of prohibition processing, and processing to generate a print job is interrupted.

FIG. 11 depicts a view illustrating an example of print data generated by the print application 301 of the information processing apparatus 105 according to the embodiment.

The print data is configured by job ticket information 11020 that corresponds to the overall job, and two units of job tickets in units of pages that are indicated by reference numerals 11030 and 11040. The exclusion information 1080, 1090, and 1100 indicated in FIG. 10B needs to apply to all of the overall job settings (job ticket information 11020), as well as the page settings (job ticket information 11030 and 11040). Accordingly, in the information processing apparatus 105, there needs to be two patterns: exclusion control (described by FIG. 4 through FIG. 7) for the job ticket information 11020 generated by the print setting generation module 303, and exclusion control (described by FIGS. 8A to 8C and FIGS. 9A to 9C) for the job ticket information 11030 and 11040, which is in units of pages. The former is realized by the print screen display module 302 and the device configuration exclusion control module 305, and the latter is realized by the print data validation module 306 and the device configuration exclusion control module 305.

When the print data illustrated in FIG. 11 is input to the image forming apparatus 101 for which the PDL data priority mode is set, the sheet type is "plain paper" described by reference numeral 11021 in the job ticket information 11020. Accordingly, the values of an envelope flap width 11022, an index sheet index width 11023, and the number of sets of index sheets 11024 are not caught by a prohibition rule.

Meanwhile, with the job ticket information 11030 and 11040, the sheet type is set to "automatic" in a page setting 11031 for P1. Accordingly, after printing starts, the print data validation module 306 detects this as an error in accordance with prohibition rule 1110. In other words, this is an error because the sheet type must not be "automatic" when the PDL data priority mode is set.

In addition, the sheet type "thick paper" (Bond) is designated by page setting 11041 for P2. With the exclusion information of FIGS. 10A and 10B, because a prohibition rule for thick paper is not especially defined, no particular violation of the prohibition rule is detected in a check regarding a data portion of P2.

FIGS. 12A to 12C depict views illustrating examples of sheet feeding stage setting screens displayed on the operation unit 231 of the image forming apparatus 101 according to the embodiment.

In the screen 1210 of FIG. 12A, it is possible to select whether to operate in the "PDL data priority mode" or operate in the "the sheet feeding stage setting mode" for each sheet feeding stage. In the case of the "PDL data priority mode", the sheet feeding processing is performed by ignoring the setting for the sheet feeding stage, and prioritizing the sheet type and the sheet size of the PDL data included in the print data. In addition, when at least one sheet feeding stage operates in the "PDL data priority mode", the configuration information 1000 notified by the image forming apparatus 101 to the information processing apparatus 105 includes information (for example, reference numeral 1040 of FIG. 10A) indicating that the "PDL data priority mode" has been set. Furthermore, notification is performed by including the exclusion information 1080 through 1090 for functions and parameters that are in an exclusion relationship with the PDL data priority mode. In the screen 1210, the "PDL data priority mode" is set with respect to the manual feed tray. In contrast, in a case of the "sheet feeding stage setting mode", when the sheet size and the sheet type included in the PDL data do not match the sheet size and the sheet type of the sheet feeding stage that is a feeding target, it is determined that there is no optimal sheets and sheet feeding processing is not performed.

A screen 1220 of FIG. 12A displays a sheet size and a sheet type that are set for each sheet feeding stage, for each sheet feeding stage of the image forming apparatus 101. A screen 1230 illustrates a screen that is transitioned to when "cassette 1" is selected in the screen 1220. In addition to the sheet size and the sheet type set to cassette 1, the screen 1230 displays a button 1231 for setting the sheet size and an orientation of the sheet, and a button 1232 for setting the sheet type.

A screen 1240 of FIG. 12B illustrates a screen that is transitioned to when the button 1231 is pressed on the screen 1230. In addition, a screen 1250 illustrates a screen that is transitioned to when the button 1232 is pressed on the screen 1230.

When "envelope" is selected on the sheet type selection screen that is the screen 1250, a screen 1260 of FIG. 12C is displayed, and a flap width of the envelope can be set in the screen 1260. When "index sheet" is selected on the sheet type selection screen that is the screen 1250, a screen 1270 is displayed, and it is possible to set the number of sets of index sheets (the number of sheets for every single set) on the screen 1270. In addition, a screen 1280 illustrates an error screen that is displayed when print data that cannot be processed in the PDL data priority mode is input to the image forming apparatus 101.

FIGS. 13A through 13C are sequence diagrams for describing an exchange of data between the image forming apparatus 101 and the information processing apparatus 105 according to the embodiment.

At reference numeral 1301, after the print settings screen 810 (FIG. 8A) of a print application, for example, is displayed on the information processing apparatus 105 and a user performs an operation, such as sheet selection, the user presses the print button 811 at reference numeral 1302. By this arrangement, at reference numeral 1303, the print screen display module 302 requests the configuration information obtainment module 307 for the device configuration information 1000. Here, if there is cached device configuration information 1000 in which time elapsed since an update, for example, is inside a valid period, such as several days or several hours, for example, the response is with the cached device configuration information 1000. If there is no cached information, however, at reference numeral 1305, the configuration information management module 311 of the image forming apparatus 101 is requested for the configuration information 1000 by way of a network protocol provided by the network control module 310. By this arrangement, at reference numeral 1306, the configuration information 1000 is sent from the image forming apparatus 101 to the configuration information obtainment module 307. The configuration information obtainment module 307 caches the obtained device configuration information, and also notifies the obtained device configuration information to the device configuration exclusion control module 305 and the print screen display module 302 (reference numeral 1307), and the print setting screen is updated at reference numeral 1308.

Note that the obtainment of the device configuration information 1000 can also be executed by a user pressing the "device configuration information obtainment" button 891 on the printer properties screen 890 of FIG. 8C. Processing in such a case is essentially the same as the processing described above, so a description thereof is omitted.

When a user sets print settings from the print setting screen of FIGS. 8A and 8B at reference numeral 1309 for example, verification of the print settings is requested of the device configuration exclusion control module 305 from the print screen display module 302 at reference numeral 1310. At reference numeral 1311, the device configuration exclusion control module 305 notifies a result of this verification to the print screen display module 302. The print screen display module 302 displays details of this notification on a UI screen to provide feedback to a user. By this arrangement, the user can redo the print setting as necessary.

When the print setting on the print setting screen of FIGS. 8A and 8B completes in this way, the user presses the print button 811 at reference numeral 1312. At reference numeral 1313, all setting information is notified from the print screen display module 302 to the device configuration exclusion control module 305, and verification of the print settings is requested of the device configuration exclusion control module 305. Consequently, the device configuration exclusion control module 305, at reference numeral 1314, notifies a result of the verification to the print setting generation module 303. Here, if there is no problem with the verification result, the print setting generation module 303 converts setting information set on the print setting screen to print ticket information, and saves the print ticket information in the print data storage module 308 (reference numeral 1315). At reference numeral 1316, the print setting generation module 303 requests the print application 301 to generate rendering data for each page, and print tickets, and the like, in units of pages (FIG. 11). Consequently, the print application 301 generates page data, and, at reference numeral 1317, requests the device configuration exclusion control module 305 for exclusion verification with respect to the generated print tickets. If there is no problem with the verification result, the page data is stored in the print data storage module 308. This processing is repeatedly performed for the number of pages in the print job, and data for which writing completes is sequentially transmitted to the image forming apparatus 101 from the print data transmission module 309 at reference numeral 1318.

The image forming apparatus 101, having received print data, analyzes the PDL data at reference numeral 1319, executes RIP processing at reference numeral 1320, and executes print processing at reference numeral 1321. This processing is repeatedly executed in units of pages.

At reference numeral 1322, when print data generation completes for the final page, at reference numeral 1323, a data termination code is notified to the image forming apparatus 101 by the print data transmission module 309. The print data receiving module 312, upon receiving the data termination code, replaces it with to a job end notification and notifies the job end notification to the job control module 313. The job control module 313 receives the job end notification, and notifies the end of the job to the PDL analyzing module 314, the RIP control module 315, and the engine control module 316.

By virtue of the embodiment described above, when the "PDL data priority mode" is set in an image forming apparatus, it is possible to prevent a user of an information processing apparatus from making a print setting that is not compatible with the "PDL data priority mode".

Consequently, when the image forming apparatus is set to the "PDL data priority mode", it is possible to prevent a problem, such as ceasing to be able to print after receiving a print job created with print settings that are not compatible with the "PDL data priority mode".

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   (A) at least one memory device that stores a set of instructions; and
   (B) at least one processor that executes the set of instructions:
      (a) to obtain, from a print apparatus, information indicating a print setting mode to which the print apparatus is set and which is selected from at least a first mode, in which the print apparatus performs printing in accordance with a print setting set by the print apparatus, and a second mode, in which the print apparatus performs printing in accordance with a print setting set by a print application executed in the information processing apparatus and transmitted from the information processing apparatus to the print apparatus, and wherein, in a case in which the print apparatus is set to the second mode, the print setting set by the print application is applied to the print apparatus in preference to the print setting set by the print apparatus; and
      (b) to provide a notification, in a case in which the obtained information indicates that the print apparatus is set to the second mode and a user has made a designation for confirming a print setting without making a print setting for a predetermined setting item via the print application, prompting the user to make a print setting for the predetermined setting item,
   wherein, in a case in which the obtained information indicates that the print apparatus is set to the first mode and the user has not made the print setting for the predetermined setting item via the print application, the notification is not provided.

2. The information processing apparatus according to claim 1, wherein the predetermined setting item is a setting for designating a size of a print sheet.

3. The information processing apparatus according to claim 1, wherein the at least one processor further executes the set of instructions (c) to provide a notification, in a case in which the obtained information indicates that the print apparatus is set to the second mode and a size setting of a print sheet in the print application is set to automatic, prompting the user to make a designation of size of the print sheet.

4. The information processing apparatus according to claim 1, wherein the at least one processor further executes the set of instructions (c) to provide a notification, in a case in which the obtained information indicates that the print apparatus is set to the second mode and a print sheet of a predetermined type is designated in the print application, prompting the user to make a setting for the print sheet of the predetermined type.

5. The information processing apparatus according to claim 1, wherein the predetermined setting item is a setting for designating an index width of an index sheet.

6. The information processing apparatus according to claim 1, wherein the predetermined setting item is a setting for designating a flap width of an envelope.

7. The information processing apparatus according to claim 1, wherein the at least one processor further executes the set of instructions (c) to obtain, in accordance with the print application being activated, from the print apparatus, the information indicating the print setting mode to which the print apparatus is set.

8. A method of controlling an information processing apparatus, the method comprising:
   obtaining, from a print apparatus, information indicating a print setting mode to which the print apparatus is set and which is selected from at least a first mode, in which the print apparatus performs printing in accordance with a print setting set by the print apparatus, and a second mode, in which the print apparatus performs printing in accordance with a print setting set by a print application in the information processing apparatus and transmitted from the information processing apparatus to the print apparatus, and wherein, in a case in which the print apparatus is set to the second mode, the print setting set by the print application is applied to the print apparatus in preference to the print setting set by the print apparatus; and
   providing a notification, in a case in which the obtained information indicates that the print apparatus is set to the second mode and a user has made a designation for confirming a print setting with making a print setting for a predetermined setting item via the print application, prompting the user to make a print setting for the predetermined setting item
   wherein, in a case in which the obtained information indicates that the print apparatus is set to the first mode and the user has not made the print setting for the predetermined setting item via the print application, the notification is not provided.

9. The method according to claim 8, wherein the predetermined setting item is a setting for designating a size of a print sheet.

10. The method according to claim 8, further comprising providing a notification, in a case in which the obtained information indicates that the print apparatus is set to the second mode and a size setting of a print sheet in the print application is set to automatic, prompting the user to make a designation of size of the print sheet.

11. The method to claim 8, further comprising providing a notification, in a case in which the obtained information indicates that the print apparatus is set to the second mode and a print sheet of a predetermined type is designated in the print application, prompting the user to make a setting for the print sheet of the predetermined type.

12. The method according to claim 8, wherein the predetermined setting item is a setting for designating an index width of an index sheet.

13. The method according to claim 8, wherein the predetermined setting item is a setting for designating a flap width of an envelope.

14. The method according to claim 8, further comprising obtaining, in accordance with the print application being activated, from the print apparatus, the information indicating the print setting mode to which the print apparatus is set.

15. A non-transitory computer-readable storage medium storing a program for causing a processor to execute a method of controlling an information processing apparatus, the method comprising:
 obtaining, from a print apparatus, information indicating a print setting mode to which the print apparatus is set and which is selected from at least a first mode, in which the print apparatus performs printing in accordance with a print setting set by the print apparatus, and a second mode, in which the print apparatus performs printing in accordance with a print setting set by a print application in the information processing apparatus and transmitted from the information processing apparatus to the print apparatus, and wherein, in a case in which the print apparatus is set to the second mode, the print setting set by the print application is applied to the print apparatus in preference to the print setting set by the print apparatus; and
 providing a notification, in a case in which the obtained information indicates that the print apparatus is set to the second mode and a user has made a designation for confirming a print setting with making a print setting for a predetermined setting item via the print application, prompting the user to make a print setting for the predetermined setting item
 wherein, in a case in which the obtained information indicates that the print apparatus is set to the first mode and the user has not made the print setting for the predetermined setting item via the print application, the notification is not provided.

16. The non-transitory computer-readable storage medium according to claim 15, wherein the predetermined setting item is a setting for designating a size of a print sheet.

17. The non-transitory computer-readable storage medium according to claim 15, wherein the method further comprises providing a notification, in a case in which the obtained information indicates that the print apparatus is set to the second mode and a size setting of a print sheet in the print application is set to automatic, prompting the user to make a designation of size of the print sheet.

18. The non-transitory computer-readable storage medium according to claim 15, wherein the method further comprises providing a notification, in a case in which the obtained information indicates that the print apparatus is set to the second mode and a print sheet of a predetermined type is designated in the print application, prompting the user to make a setting for the print sheet of the predetermined type.

19. The non-transitory computer-readable storage medium according to claim 15, wherein the predetermined setting item is a setting for designating an index width of an index sheet.

* * * * *